US008179958B2

(12) United States Patent
Komiya et al.

(10) Patent No.: US 8,179,958 B2
(45) Date of Patent: May 15, 2012

(54) DEVICE SWITCHING SYSTEM, AND SENDER AND DISTRIBUTION DESTINATION DEVICE

(75) Inventors: Daisaku Komiya, Kanagawa (JP); Yoshimasa Honda, Tokyo (JP); Sachiko Takeshita, Tokyo (JP)

(73) Assignee: Panasonic Corporation, Osaka (JP)

( * ) Notice: Subject to any disclaimer, the term of this patent is extended or adjusted under 35 U.S.C. 154(b) by 1402 days.

(21) Appl. No.: 11/666,608

(22) PCT Filed: Feb. 8, 2006

(86) PCT No.: PCT/JP2006/302140
§ 371 (c)(1),
(2), (4) Date: Apr. 30, 2007

(87) PCT Pub. No.: WO2006/100843
PCT Pub. Date: Sep. 28, 2006

(65) Prior Publication Data
US 2008/0205507 A1    Aug. 28, 2008

(30) Foreign Application Priority Data
Mar. 24, 2005 (JP) .................. 2005-086430

(51) Int. Cl.
H04N 7/12      (2006.01)
H04N 11/02     (2006.01)
H04N 11/04     (2006.01)
H04N 7/173     (2011.01)
G06K 9/46      (2006.01)
G06F 15/16     (2006.01)
G01S 3/78      (2006.01)
H04W 4/00      (2009.01)
H04N 5/926     (2006.01)
H04N 9/804     (2006.01)
H04N 7/26      (2006.01)

(52) U.S. Cl. ......... 375/240.01; 375/240.26; 375/240.27; 382/245; 725/91; 709/231

(58) Field of Classification Search ............ 375/240.01, 375/240.26, 240.27; 382/245; 725/91; 709/231
See application file for complete search history.

(56) References Cited

U.S. PATENT DOCUMENTS
5,414,804 A * 5/1995 McWaid .................. 382/245
(Continued)

FOREIGN PATENT DOCUMENTS
EP        524792 A2 *    1/1993

OTHER PUBLICATIONS

G. Lienhart, R. Männer, K. H. Noffz, R. Lay; "An FPGA-based video compressor for H.263 compatible bit streams"; Feb. 2001; FPGA '01: Proceedings of the 2001 ACM/SIGDA ninth international symposium on Field programmable gate arrays; Publisher: ACM; pp. 207-212.*

(Continued)

*Primary Examiner* — Eleni Shiferaw
*Assistant Examiner* — Courtney Fields
(74) *Attorney, Agent, or Firm* — Wenderoth, Lind & Ponack, L.L.P.

(57) ABSTRACT

When a switching target device receives a media output indication from a sender device, a switch connects with contact B, which causes all image data stored in an extended media buffer to be inputted in a decoder, starting from the first frame (which is an I-frame) of the image data. The decoder decodes the image data, starting from the I-frame, and stores a reconstructed image in a reconstructed-image buffer. A reconstructed image required for decoding video picture data outputted from a media buffer is held in the reconstructed-image buffer. Thus, when device switching occurs, the decoder can immediately start decoding regardless of whether video picture data inputted from the media buffer is an intraframe.

26 Claims, 20 Drawing Sheets

U.S. PATENT DOCUMENTS

| | | | | |
|---|---|---|---|---|
| 6,167,083 | A | * | 12/2000 | Sporer et al. ............. 375/240.01 |
| 2002/0129374 | A1 | * | 9/2002 | Freeman et al. ................ 725/91 |
| 2007/0136488 | A1 | * | 6/2007 | Cho et al. ...................... 709/231 |

OTHER PUBLICATIONS

Ken Ohta et al., "Mobile Multimedia Middleware for Implementing Seamless Service", Technical Report of Information Processing Society of Japan, Mobile computing and wireless communication, Sep. 7, 2001, vol. 2001, No. 83, pp. 261-268 along with English extract.

Dongwook Lee et al., "Seamless Media Streaming over Mobile IP-enabled Wireless LAN", Proceedings of the 2005 IEEE Conference on Consumer Communications and Networking, Jan. 3, 2005, pp. 116-121.

Yuko Onoe et al., "Mobility Extended Multimedia Session Controls for Mobile Seamless Communication Environments", the transactions of the Institute of Electronics, Information and Communication Engineers B, Aug. 1, 2003, vol. J86-B, No. 8, pp. 1379-1388 along with English extract.

Masatoshi Kawarasaki et al., "Metadata driven Seamless Content Handover in Ubiquitous Environment", Proceedings of the 2004 International Symposium on Applications and the Internet, 2004, pp. 287-290.

Ken Ohta et al., "Adaptive Terminal Middleware for Session Mobility", Proceedings of the 23$^{rd}$ International Conference on Distributed Computing Systems Workshops, May 19, 2003, pp. 394-399.

English translation of the International Preliminary Report on Patentability issued Sep. 25, 2007 in PCT/JP2006/302140.

\* cited by examiner

DEVICE SWITCHING SYSTEM, AND SENDER AND DISTRIBUTION DESTINATION DEVICE

TECHNICAL FIELD

The present invention relates to a communication technique and a media transmission technique in an IP network. In particular, the present invention relates to a fast image decoding technique in fast device switching for transmitting motion video to an appropriate device within a personal area network (PAN).

BACKGROUND ART

Like fiber-optic communication and ADSL technologies in fixed networks, spot wireless network technologies such as WLAN and ad hoc network technologies have become widespread in mobile networks in recent years. A "network existing everywhere", namely a ubiquitous network environment that will make possible network connection anywhere, anytime, and from anything is turning into reality. In the field of communication terminal products, devices, such as network-enabled appliances and terminals with cellular/WLAN dual interface, that have a wide variety of capabilities have been developed. In these circumstances, there is a strong demand for "seamless service" that flexibly switches between various access networks and devices having various capabilities in a ubiquitous network environment to make possible communications to continuously provide service to a user without requiring the user to do anything as the user moves about.

The following three seamless techniques for implementing such seamless service have been proposed. A first technique is called the "network seamless" technique. The "network seamless" technique enables a mobile terminal to seamlessly switch from one network to another as the terminal moves about. The mobile terminal has multiple network interfaces and is capable of flexibly switching between different access networks as it moves. The "network seamless" is sometimes also called the "terminal mobility".

A second technique is called the "device seamless" technique. The "device seamless" technique enables a user to seamlessly switch from a terminal the user is currently using to another terminal. In this technique, a session being used on one terminal can be continuously used on the other terminal. The "device seamless" technique transfers a session on a terminal to another in this way, hence is also called the "session mobility" technique.

A third technique is called the "content seamless" technique. The "content seamless" technique enables switching between media of different formats or types. In the "content seamless" technique, one can switch from one media to another to display or play back a content according to network bandwidth, device capability, or surroundings. The "content seamless" is sometimes called "media adaptive".

The three techniques are crucially important in implementing seamless service and their respective unique effects can be obtained independently. These techniques can be used separately or in any combination.

Seamless service to which the device seamless technique is applied (hereinafter the service is referred to as "device switching") is required in the following situation. For example, a user may come home while watching a streaming movie on a mobile terminal such as a cellphone, enter the living room, and immediately turn on a television set to watch the rest of the movie on its large display. Typical mobile terminals have too small a display to watch movies. The device seamless technique would become far more advantageous if the technique enables seamless switching from one device to a more preferable device that is capable of taking over the service when the device is found near the user as the user moves from one place to another. In view of this advantage of device switching, techniques for implementing such device switching have been developed.

FIG. 14 illustrates a typical configuration of a device switching system. The system shown in its entirety in FIG. 14 includes a mobile node (MN) 2001, which is the sender device used, a correspondent node (CN) 2002, which is a node with which the mobile node 2001 is communicating, the Internet 2003, a group of devices 2004 such as a plasma television set, a stereo player, and a personal computer (PC) to which device switching can be performed, and a personal area network (PAN) 2005 consisting of the MN 2001 and the group of devices 2004. The plasma television, stereo player, and PC constituting the device group 2004 are not limitative; they are illustrative only. The MN 2001 does not need to be a mobile device and is no different from the devices in the group 2004.

The MN 2001 and the group of devices 2004 can use the PAN 2005 to communicate one another within the PAN 2005. The CN 2002 and the MN 2001 are communicating with each other through the Internet 2003. The CN 2002 may be a streaming server, for example, and MN 2001 is receiving a streaming movie distributed from the CN 2002. The network interconnecting the MN 2001 and the CN 2002 dose not need to be the Internet; it may be a Third-Generation Partnership Project (3GPP) network, for example.

FIG. 15 is a block diagram illustrating an internal device configuration of MN 2001 for accomplishing device switching. The MN 2001 includes an application 2101, one or more network interface 2102, an output section which displays and outputs data, an input section 2104 which serves as an interface with an user, an operating system 2105, a media transmitter 2106 which communicates with an external device (not shown) through the operating system 2105, a media receiver 2107, a media buffer 2108 which holds media data received at the media receiver 2107, a decoder section 2109 which decodes media data if the media data is compressed, a signaling section 2110 which controls sessions, a service discovery section 2111 which discovers a service provided by an external switching target device (not shown), and middleware 2112 which controls the media transmitter 2106 to transfer received media data to a switching target device.

As mentioned above, the MN 2001 can be considered as one of the devices in the device group 2004. Switching target devices to which switching can be performed has a configuration similar to that of the MN 2001. However, switching target devices do not need to have an application 2101, an input section 2104, and a media transmitter 2106 if they do not need function as a switching source device.

FIG. 16 shows a message sequence between the MN 2001 and a group of switching target devices 2004; FIG. 17 is a flowchart of the message sequence. The assumption here is that the device group 2004 consists of N devices (device 1 to device N). Although not shown, the MN 2001 has another session with CN 2002. The "user" shown in FIG. 16 is the user who is currently using the MN 2001 and can issue an instruction to the MN 2001 through a user interface provided by the application 2101 running on the MN 2001. The arrows in FIG. 16 represent that a message is sent from the arrows' start points to end points.

The steps shown in FIG. 17 will be detailed below. First, a user attempting to make device switching issues a request to list switching target devices (U1) to the MN 2001 through the input section 2104 of the MN 2001 (S2301). The middleware 2112 receives the instruction and broadcasts a service discovery request (M1) to devices 1 to N in the PAN through the service discovery section 2111 (S2302). When the service discovery sections 2111 of switching target devices receive the service discovery request (M1), the service discovery sections 2111 return service discovery responses (M2) to the MN 2001 (S2303). The service discovery protocol used by the service discovery section 2111 is not limited to a particular one. Any of the existing protocols such as UPnP (Universal Plug and Play) SSDP (Simple Service Discovery Protocol), SDP of Blue-tooth, or SLP (Service Location Protocol) may be used.

The service discovery section 2111 of the MN 2001 receives the service discovery responses (M2) from the switching target devices and notifies the middleware 2112 of the responses (M2). The middleware 2112 generates, on the basis of the notification, a switching target device list consisting of devices capable of providing the service and the output section 2103 presents (U2) the list to the user through the operating system 2105 (S2304). When the user receives the switching target device list, the user selects (U3) a switching target device from the presented switching target device list through the input section 2104 and the selected device is notified to the middleware 2112 (S2305). It is assumed here that "Device 2" is selected.

The middleware 2112 sends a request to establish session and prepare for media processing (M3) to the switching target "Device 2" through the signaling section 2110 in order to establish a session with the selected switching target device, "Device 2", in the PAN to transmit media data. At the same time, the middleware 2112 directs the media receiver 2107 and the media transmitter 2106 to start preparing for transferring received media data to the switching target device (S2306). The protocol used by the signaling section 2110 is not limited to any particular one; any of existing protocols such as SIP (Session Initiation Protocol) may be used.

When the signaling section 2110 of the switching target, "Device 2", receives the request to establish session and prepare for media processing from the MN 2001, the middleware 2112 directs the media receiver 2107, the media buffer 2108, and the decoder section 2109 to start preparing for media processing. On completion of the media processing preparation, the middleware 2112 sends a session established and prepared for media processing response (M4) through the signaling section 2110 (S2307).

When the signaling section 2110 of the MN 2001 receives the session established and prepared for media processing response (M4) from the switching target, "Device 2", the middleware 2112 directs the media transmitter 2106 to start transmission (D1) of the media data that the media receiver 2107 has received from the CN 2002 (S2308).

The media receiver 2107 of the switching target "Device 2" receives the media data transferred from the MN 2001 and starts buffering the media data in the media buffer 2108. After a certain amount of data is buffered in the media buffer 2108, the middleware 2112 directs the decoder section 2109 to start decoding the media data if the data is compressed. The decoder section 2109 outputs (D2) the decoded media data to the output section 2103 through the operating system 2105 (S2309). If the media data is not compressed, the decoder section 2109 outputs the media data buffered in the media buffer 2108 to the output section 2103 through the operating system 2105.

Through the steps described above, device switching from the MN 2001 to Device 2 selected as the switching target device can be made. As a result, the media data that was outputted on the output section 2103 of the MN 2001 is outputted on the output section 2103 of the switching target "Device 2". In this switching sequence, the time between the user issuing the request to list switching target devices (U1) to the MN 2001 and the switching target "Device 2" outputting data on its outputting section 2103 (D2) is the time required for device switching. The shorter the time required for the switching, the shorter the waiting time experienced by the user involved in the switching and the more seamless the service provided to the user.

However, the conventional technique described above takes time on the order of several seconds between issuing a service discovery request (M1) and receiving a service discovery response (M2). The technique also takes time on the order of several seconds between issuing a request to establish session and prepare media processing (M3) and receiving a session established and prepared for media processing response (M4). Consequently, the time required for the switching, that is, the waiting time experienced by the user is quite long. In these circumstances, if the user is watching a soccer game broadcast in real time, for example, the user can miss an important moment such as a goal scoring moment because of the long device switching time.

Two techniques for reducing the time required for device switching are disclosed in the article "Mobile multimedia middleware for implementing seamless service" in Technical Report of Information Processing Society of Japan ("Mobile computing and wireless communication", 2001, No. 18-No. 35). The first one of the techniques is to "perform service discovery beforehand at regular intervals" and the second technique is to "establish sessions with all devices found by the service discovery and prepare for media processing beforehand".

How the two techniques can reduce the time required for device switching will be described with reference to drawings. It should be noted that MN 2001 and switching target devices used in the techniques disclosed in the article "Mobile multimedia middleware for implementing seamless service" in Technical Report of Information Processing Society of Japan (Mobile computing and wireless communication", 2001, No. 18-No. 35) have the same internal configuration as those of typical, conventional terminals, except for middleware 2112, which operates differently. Therefore, in order to distinguish the middleware in the techniques disclosed in the article "Mobile multimedia middleware for implementing seamless service" in Technical Report of Information Processing Society of Japan ("Mobile computing and wireless communication", 2001 No. 18-35) from middleware 2112 according to typical, conventional techniques, the former middleware will be referred to as the "fast middleware". The same elements as those in the conventional techniques will be labeled with the same reference numerals that are used in the foregoing description.

FIGS. 18, 19, and 20 are a diagram showing a message sequence between an MN 2001 and a group of devices 2004 (FIG. 18) in the techniques disclosed in the article "Mobile multimedia middleware for implementing seamless service" in Technical Report of Information Processing Society of Japan ("Mobile computing and wireless communication", 2001, No. 18-No. 35), a flowchart showing operation of the sender device in the sequence (FIG. 19), and a flowchart showing operation of a switching target device in the sequence (FIG. 20). Again, it is assumed that the device group 2004 consists of N devices, device 1 to device N. Although not shown, the MN 2001 has another session with a CN 2002.

Referring to FIG. 19, operation of the sender device from which switching is to be made will be described first. The sender device determines whether a session with the CN 2002 is retained (S2501). If the sender device determines that a session with the CN 2002 is not retained (S2501: No), the sender device will end the process. On the other hand, if the sender device determines that a session with CN 2002 is retained (S2501: Yes), the fast middleware of the sender device broadcasts a service discovery request (M1) to devices 1 to N in the PAN through the service discovery section 2111 at regular intervals (S2502). When receiving the service discovery request, switching target devices send (return) service discovery responses to the service discovery sections 2111 of the sender device. The sender device provides notification about the service discovery responses received from the switching target devices from the service discovery section 2111 to the fast middleware. The fast middleware generates a list of switching target devices capable of providing the service, on the basis of the notification, and holds the list internally (S2503). If the fast middleware already holds a switching target device list, the fast middleware overwrites the list with the newly generated switching target device list.

The fast middleware sends a request to establish session and prepare for media processing (M3) through the signaling section 2110 in order to establish a session with the candidate switching target devices on the switching target device list to transmit media (S2504). The number of the candidate switching target device is equal to n (where $1 \leq n \leq N$). The fast middleware directs the media receiver 2107 and the media transmitter 2106 to start preparing for transferring received media data to a switching target device (S2505). When the signaling section 2110 receives a session established and prepared for media processing response from the candidate switching target devices, the fast middleware waits a predetermined amount of time (S2506). During the waiting time, the fast middleware determines whether a request to list switching target devices (U1) is issued by the user (S2507). If it determines that such a request is not made (S2507: No), the sender device returns to step S2501 and repeats the subsequent service discovery steps. On the other hand, if the fast middleware determines that a list request is issued (S2507: Yes), the process proceeds to step S2508, where the fast middleware presents the switching target device list it internally holds to the user through the output section 2103 (U2).

The user selects a switching target device from the switching target device list through the input section 2104 (U3) (S2509). Information about the device selected here is provided to the fast middleware through the operating system 2105. In the example shown in the sequence diagram, it is assumed that "Device 2" is selected.

The fast middleware directs the media transmitter 2106 to start transmission of the media data (D1) received by the media receiver 2107 from CN 2002 (S2510). In response to this direction, the media transmitter 2106 starts transferring the media data to the switching target "Device 2". The fast middleware sends a session discontinue request (M5) to all candidate switching target devices other than "Device 2" through the signaling section 2110 (S2511), then receives session discontinued responses from those devices (M6) and ends the switching operation. Up to this point, operation of the sender device has been described.

Operation of a switching target device will be described next with reference to FIG. 20. When a candidate switching target device receives a service discovery request, its service discovery section 2111, sends (returns) a service discovery response (M2) to the MN 2001 (S2601). The signaling section 2110 of the candidate switching target device receives a request to establish a session and prepare media processing ("Session establish request" in FIG. 20) from the MN 2001 (S2602). After receiving the session establish request, the fast middleware directs the media receiver 2107, media buffer 2108, and the decoder section 2109 to start preparing for media processing (S2603). On completion of the preparation for media processing, the fast middleware sends a session established and prepared for media processing response (M4) to the sender device through the signaling section 2110 (S2604).

If media data is transferred, the media receiver 2107 of the switching target "Device 2", starts to receive the media data transferred from the sender device (S2605) and starts buffering (storing) the media data in the media buffer 2108 (S2606). After a certain amount of data is buffered in the media buffer 2108, the fast middleware determine whether the buffered media data is uncompressed data (S2607). If the media data is uncompressed (S2607: Yes), the fast middleware sends the data buffered in the media buffer 2108 to the output section 2103 through the operating system 2105. On the other hand, if the media data is compressed (S2607: No), the fast middleware directs the decoder section 2109 to start decoding the data (S2608). The decoded data is then sent to the output section 2103 through the operating system 2105. The output section 2103 starts outputting the received data (D2), and thus the switching operation is completed (S2609).

On the other hand, if the signaling section 2110 of the candidate switching target device receives a session discontinue request (M5) from the sender device, the fast middleware directs the media receiver 2107, the media buffer 2108, and the decoder section 2109 to terminate the preparation for media processing. Thus the preparation for media reception will end (S2610). After the preparation for media processing terminates, the fast middleware sends a session discontinued response (M6) to the sender device through the signaling section 2110 (S2611). Thus, the switching operation ends.

In this way, the techniques disclosed in the article "Mobile multimedia middleware for implementing seamless service" in Technical Report of Information Processing Society of Japan ("Mobile computing and wireless communication", 2001, No. 18-35) enable fast switching from the sender device to the switching target device. The effects of each of the above-described two new techniques for reducing the time required for device switching will be summarized below.

The effect of the first technique (which performs service discovery operation at regular intervals beforehand) is that the time involved in the service discovery at device switching can be practically reduced to zero by performing the operation from transmission of service discovery request (M1) to reception of a service discovery response (M2) (steps S2502 through S2503 and S2601) at regular intervals before a request to list switching target devices is issued by the user (S2507). Thus, the first technique can reduce the waiting time for the device list to be presented to the user.

The effect of the second technique (which establishes sessions with all devices found as a result of device discovery and prepares for media processing beforehand) is that the time involved in the session establishment at device switching can be practically reduced to zero by performing the operation from transmission of a request to establish a session and prepare for media processing (M3) to reception of a session established and prepared for media processing response (M4) (steps S2504 through S2506 and S2602 through S2604) for all candidate switching target devices found through service discovery before a switching target device is selected by the user (S2509). Thus, the second technique can reduce the waiting time for the selected switching target device to become prepared for media processing.

The effects described above significantly reduce the time required for switching, that is, the time between the issuance of a request to list switching target devices (U1) to the sender device by the user attempting to switch and the output of media data on the output section of the switching target device (D2).

SUMMARY OF THE INVENTION

However, the techniques disclosed in the article "Mobile multimedia middleware for implement seamless service" in Technical Report of Information Processing Society of Japan ("Mobile computing and wireless communication", 2001, No. 18-35) take a time on the order of several hundred milliseconds between the start of reception of media data on the switching target device and the start of output of the media data on the output section of the switching target device (steps S2605 through S2609).

When interframe-compressed motion video data such as MPEG data is used, the amount of the waiting time described above increases. The decoder section can only start decoding at positions where an intraframe is inserted in interframe-compressed video picture data. Therefore, even though data is buffered in a media buffer 2108, if the first frame of the data is not an intraframe, the decoder section cannot immediately start decoding the data and waits for until an intraframe is inputted in the decoder section.

The "time on the order of several hundred milliseconds" is significantly short compared with the "time on the order of seconds" but is still long waiting time from the viewpoint of providing perfectly seamless service to the user. It is desirable to further reduce the waiting time.

The present invention has been made in light of these circumstances and an object of the present invention is to provide a technique that enables quick starting of decoding from a frame of interframe-compressed video picture data such as MPEG data where device switching occurred, thereby enabling device switching so fast that the user cannot perceive the switching delay (that is, decoding is started virtually at the same time as the switching).

In order to solve the problems, the present invention provides a device switching system, a sender device, and distribution destination devices that have the following configuration.

A device switching system according to the present invention includes a sender device which has a session with a correspondent device and a plurality of distribution destination devices capable of communicating with the sender device, wherein the sender device sends video picture data compressed by interframe compression method sent in the session to the plurality of distribution destination devices, the video picture data compressed by the interframe compression method is received by distribution destination devices selected from among the plurality of distribution destination devices, the sender device chooses a switching target device from among the selected distribution destination devices, and the switching target device outputs the intraframe-compressed video picture data on the choosing of the switching target device. The interframe-compressed video data from the sender device to the plurality of distribution destination devices may be multicast or broadcast.

Each of the distribution destination devices in the device switching system according to the present invention includes, for example: a media receiver which communicates with an external device; a media buffer which holds video picture data compressed by interframe compression method received at the media receiver; a decoder section which decodes video picture data compressed by interframe compression method; a signaling section which controls session; a network interface; and an output section which outputs the video picture data.

A first mode of the decoder section of a distribution destination device includes: a decoder which decodes video picture data compressed by interframe compression method when the video data is outputted from the media buffer; a reconstructed-image buffer which holds the decoded reconstructed image; and a switch which causes the reconstructed image to be outputted to the output section when the device switching is performed.

A second mode of the decoder section of a distribution destination device includes: an extended media buffer which stores multiple frames of the video picture data compressed by interframe compression method outputted from the media buffer; an I-frame counter which determines whether video picture data inputted in the extended media buffer is an I-frame or not and, if the video picture data is an I-frame, controls the extended media buffer to clear a plurality of frames of video picture data stored in the extended media buffer and to start storing the video picture data from the inputted I-frame; a decoder which, when the device switching occurs, decodes multiple frames of video picture data stored in the extended media buffer in sequence starting from an I-frame, and then decodes video picture data outputted from the media buffer after the device switching; a reconstructed-image buffer which holds a decoded reconstructed image; and a switch which causes a reconstructed image to be outputted to the output section when a video picture data outputted from the media buffer is decoded.

A third mode of the decoder section of a distribution destination device includes: a decoder which, when the device switching occurs, decodes an image compressed by intraframe coding sent from the media receiver and then decodes video picture data outputted from the media buffer; a reconstructed-image buffer which holds the decoded reconstructed image; and a switch which causes a reconstructed image to be outputted to the output section after the image encoded by intraframe coding sent from the media receiver is decoded. The media receiver extracts an intraframe-coded image attached to the payload of a media output indication sent from the sender device provided through the signaling section, on the basis of the media output indication, and sends the intraframe-coded image to the decoder section.

A fourth mode of the decoder section of a distribution destination device includes: an extended media buffer which stores video picture data; an I-frame counter which determines whether video picture data outputted from the media buffer is an I-frame or not and, if the video picture data is an I-frame, controls the extended media buffer to clear an I-frame stored in the extended media buffer and to store the I-frame of the outputted video picture data; a decoder which, when the device switching occurs, decodes an I-frame stored in the extended media buffer, then decodes an interframe-coded image sent from the media receiver, and then decodes video picture data outputted from the media buffer after the device switching; a reconstructed-image buffer which holds the decoded reconstructed image; and a switch which causes a reconstructed image to be outputted to the output section after the interframe-coded image sent from the media receiver is decoded. In this mode, the media receiver may obtain an interframe-coded image attached to the payload of a media output indication sent from the sender device provided through the signaling section, on the basis of the media output indication, and may send the interframe-coded image to the decoder section.

The sender device included in the device switching system according to the present invention includes, for example: an application; a network interface; an output section which outputs media data and an input section which is a user interface; a media transmitter and a media receiver which transmit and receive data to and from an external device; a media buffer which holds video picture data compressed by interframe compression method received by the media receiver; a decoder section for decoding video picture data compressed by interframe compression method; an encoder section which encodes a reconstructed image decoded by the decoder section; a signaling section for controlling a session; and a service discovery section for discovering a service provided by an external device; wherein the media transmitter selects a distribution destination device on the basis of a response from the service discovery section and transfers the video picture data compressed by interframe compression method received from the correspondent device to the selected distribution destination device.

A first mode of the encoder section of the sender device includes: a reconstructed-image buffer which overwrites a reconstructed image decoded by the decoder section to update the reconstructed image and holds the updated reconstructed image; and an intraframe encoder which encodes a reconstructed image held in the reconstructed-image buffer as an intraframe when the device switching occurs. In this mode, the media transmitter may attach an intraframe-coded image generated by the encoder section to the payload of the media output indication when the media transmitter provides the media output indication to a switching target device.

A second mode of the encoder section of the sender device includes: a reconstructed-image buffer which overwrites a reconstructed image decoded by the decoder section to update the reconstructed image and holds the updated reconstructed image; an I-frame detector which determines whether the reconstructed image is an I-frame or not when the reconstructed image is decoded at the decoder section; a second reconstructed-image buffer which overwrites the reconstructed image to update the reconstructed image and holds the updated reconstructed image as a reference image if the I-frame detector determines that the reconstructed image is an I-frame; and an interframe encoder which encodes a reconstructed image held in the reconstructed-image buffer by interframe coding using a reference image held in the second reconstructed-image buffer when the device switching occurs. In this mode, the media transmitter may attach an interframe-coded image generated by the encoder section to the payload of the media output indication when the media transmitter provides the media output indication to a switching target device.

As will be described later, there are other embodiments of the present invention. Therefore, the disclosure of the present invention herein is intended only some of possible embodiments of the present invention and is not intended to restrict intend the scope described above and claimed herein.

According to the present invention, there is provided a technique that enables quick starting of decoding from a frame where switching occurred, thereby making possible device switching that is so fast that a user cannot perceive the switching delay, even if interframe-compressed video picture data such as MPEG data is used.

DETAILED DESCRIPTION OF THE INVENTION

Figure 1:
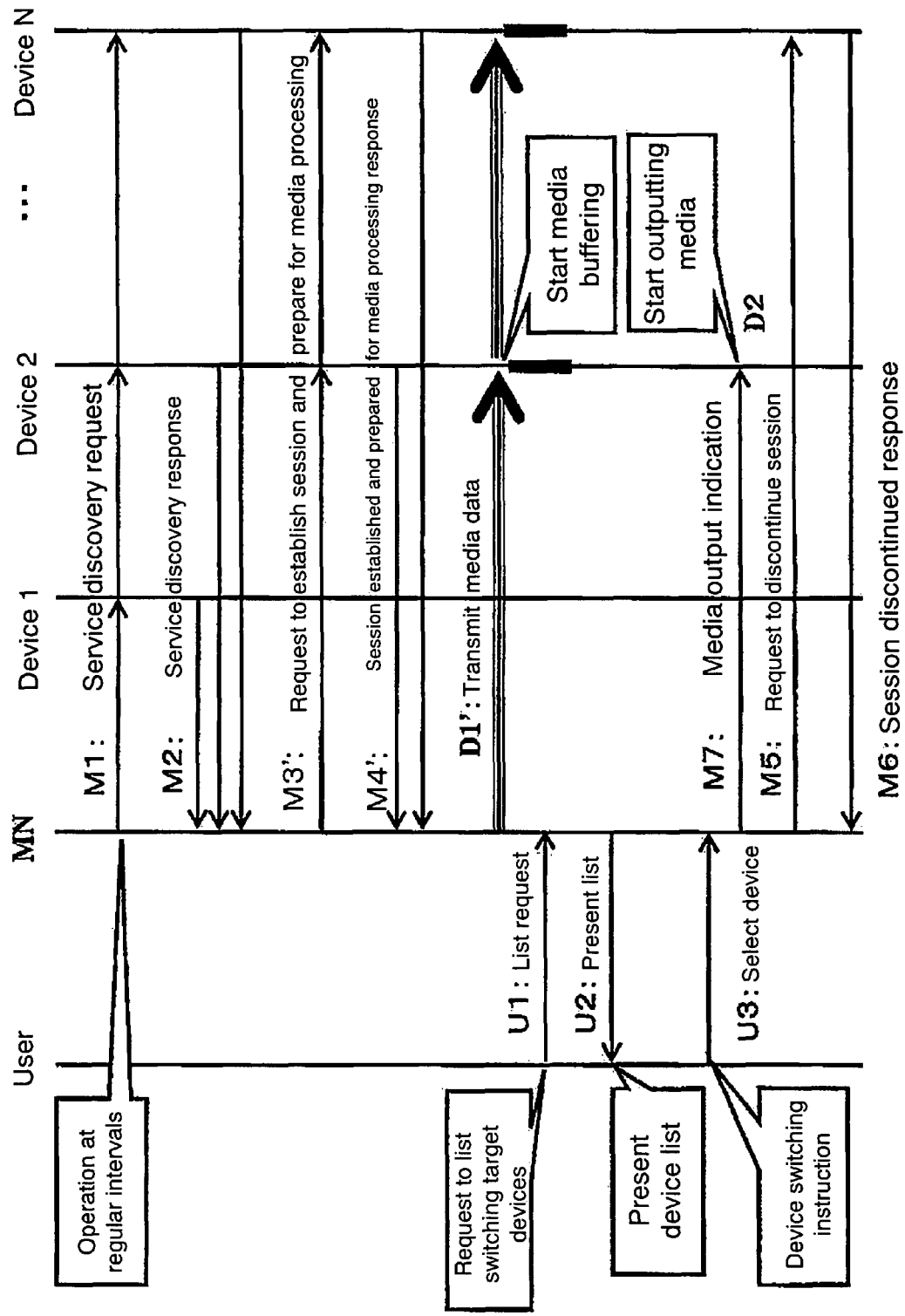
FIG. 1 shows a message sequence between a sender device and switching target devices according to a first embodiment.

The present invention will be described below in detail. However, the detailed description herein and the accompanying drawings do not limit the present invention. Instead, the present invention is defined by the accompanying claims.

A device switching system according to an embodiment of the present invention includes a sender device which has a session with a correspondent device and a plurality of distribution destination devices capable of communicating with the sender device, wherein the sender device sends video picture data compressed by interframe compression method sent in the session to the plurality of distribution destination devices, the video picture data compressed by the interframe compression method is received by distribution destination devices selected from among the plurality of distribution destination devices, the sender device chooses a switching target device from among the selected distribution destination devices, and the switching target device outputs the interframe-compressed video picture data on the choosing of the switching target device. The interframe-compressed video data from the sender device to the plurality of distribution destination devices may be multicast or broadcast.

The configuration described above enables the sender device to multicast or broadcast media data transmitted in a session with the correspondent device so that the distribution destination devices which are candidate switching target devices to which switching will be made can store the transmitted media data prior to an indication of a selected switching target device provided by the user. Thus, the distribution destination device chosen by the user as a switching target device can output the stored media data instantly upon the selection of the device, thereby significantly improving speed of the device switching. The user practically perceives no "switching delay", therefore quality of seamless service can be improved.

Each of the distribution destination devices in the device switching system according to the embodiment of the present invention includes, for example: a media receiver which communicates with an external device; a media buffer which holds video picture data compressed by interframe compression method received at the media receiver; a decoder section which decodes video picture data compressed by interframe compression method; a signaling section which controls session; a network interface; and an output section which outputs the video picture data.

This configuration enables the distribution destination device chosen by the user as a switching target device to output the media data stored beforehand in its media buffer instantly upon the selection of the device.

A first mode of the decoder section of a distribution destination device includes: a decoder which decodes video picture data compressed by interframe compression method when the video data is outputted from the media buffer; a reconstructed-image buffer which holds the decoded reconstructed image; and a switch which causes the reconstructed image to be outputted to the output section when the device switching is performed.

A second mode of the decoder section of a distribution destination device includes: an extended media buffer which stores multiple frames of the video picture data compressed by interframe compression outputted from the media buffer; an I-frame counter which determines whether video picture data inputted in the extended media buffer is an I-frame or not and, if the video picture data is an I-frame, controls the extended media buffer to clear a plurality of frames of video picture data stored in the extended media buffer and to start storing the video picture data from the inputted I-frame; a decoder which, when the device switching occurs, decodes multiple frames of video picture data stored in the extended media buffer in sequence starting from an I-frame, and then decodes video picture data outputted from the media buffer after the device switching; are constructed-image buffer which holds a decoded reconstructed image; and a switch which causes a reconstructed image to be outputted to the output section when a video picture data outputted from the media buffer is decoded.

A third mode of the decoder section of a distribution destination device includes: a decoder which, when the device switching occurs, decodes an image compressed by intraframe coding sent from the media receiver and then decodes video picture data outputted from the media buffer; a reconstructed-image buffer which holds the decoded reconstructed image; and a switch which causes a reconstructed image to be outputted to the output section after the image encoded by intraframe coding sent from the media receiver is decoded. The media receiver extracts an intraframe-coded image attached to the payload of a media output indication sent from the sender device provided through the signaling section, on the basis of the media output indication, and sends the intraframe-coded image to the decoder section.

A fourth mode of the decoder section of a distribution destination device includes: an extended media buffer which stores video picture data; an I-frame counter which determines whether video picture data outputted from the media buffer is an I-frame or not and, if the video picture data is an I-frame, controls the extended media buffer to clear an I-frame stored in the extended media buffer and to store the I-frame of the outputted video picture data; a decoder which, when the device switching occurs, decodes an I-frame stored in the extended media buffer, then decodes an interframe-coded image sent from the media receiver, and then decodes video picture data outputted from the media buffer after the device switching; a reconstructed-image buffer which holds the decoded reconstructed image; and a switch which causes a reconstructed image to be outputted to the output section after the interframe-coded image sent from the media receiver is decoded. In this mode, the media receiver may obtain an interframe-coded image attached to the payload of a media output indication sent from the sender device provided through the signaling section, on the basis of the media output indication, and may send the interframe-coded image to the decoder section.

With these configurations of the decoder section, a reconstructed image required for decoding image data outputted from the media buffer is always held in the reconstructed-image buffer. Therefore, regardless of whether video picture data inputted from the media buffer upon device switching is an intraframe or not, the decoder can instantly start decoding the video picture data. Upon receiving a media output indication from the sender device, the distribution destination device turns on and the reconstructed image decoded by its decoder is provided to the output section, where the image is then displayed. In this way, the distribution destination device can start decoding at the first frame in the media buffer. Even if interframe-compressed video picture data such as MPEG data is used, decoding can be started quickly at the frame where device switching occurred. Thus, the device switching can be done so fast that the user will not perceive the switching delay.

The sender device included in the device switching system according to the embodiment of the present invention includes, for example: an application; a network interface; an output section which outputs media data and an input section which is a user interface; a media transmitter and a media receiver which transmit and receive data to and from an external device; a media buffer which holds video picture data compressed by interframe compression method received by the media receiver; a decoder section for decoding video picture data compressed by interframe compression method; an encoder section which encodes a reconstructed image decoded by the decoder section; a signaling section for controlling a session; and a service discovery section for discovering a service provided by an external device; wherein the media transmitter selects a distribution destination device on the basis of a response from the service discovery section and transfers the video picture data compressed by interframe compression received from the correspondent device to the selected distribution destination device.

A first mode of the encoder section of the sender device includes: a reconstructed-image buffer which overwrites a reconstructed image decoded by the decoder section to update the reconstructed image and holds the updated reconstructed image; and an intraframe encoder which encodes a reconstructed image held in the reconstructed-image buffer as an intraframe when the device switching occurs. In this mode, the media transmitter may attach an intraframe-coded image generated by the encoder section to the payload of the media output indication when the media transmitter provides the media output indication to a switching target device.

A second mode of the encoder section of the sender device includes: a reconstructed-image buffer which overwrites a reconstructed image decoded by the decoder section to update the reconstructed image and holds the updated reconstructed image; an I-frame detector which determines whether the reconstructed image was an I-frame or not when the reconstructed image was decoded at the decoder section; a second reconstructed-image buffer which overwrites the reconstructed image to update the reconstructed image and holds the updated reconstructed image as a reference image if the I-frame detector determines that the reconstructed image was an I-frame; and an interframe encoder which encodes a reconstructed image held in the reconstructed-image buffer by interframe coding using a reference image held in the second reconstructed-image buffer when the device switching occurs. In this mode, the media transmitter may attach an interframe-coded image generated by the encoder section to the payload of the media output indication when the media transmitter provides the media output indication to a switching target device.

With these configurations of the encoder section, a reconstructed image required for decoding image data outputted from the media buffer of the switching target device can be encoded and the encoded image can be sent to the switching target device. In this way, the switching target device can start decoding from the first frame in the media buffer. Even if interframe-compressed video picture data such as MPEG data is used, decoding can be started at the frame where switching occurred and therefore the device switching can be done so fast that the user will not perceive the switching delay.

Embodiments of the present invention will be described with respect to the accompanying drawings.

First Embodiment

In a fast device switching system according to a first embodiment, a device from which switching is to be made (sender device) multicasts or broadcasts multimedia data transmitted in a session with a corresponding device, and candidate switching target devices (distribution destination devices) receive the sent media data and store it in their media buffers before the user selects a switching target device. With this configuration, the switching target device chosen by the user can instantly output the media data stored in the media buffer. Accordingly, significantly faster device switching can be achieved. The fast device switching can improve the quality of seamless service because the user practically does not experience "switching delay". Switching time reduction by the fast device switching will be described with respect to drawings.

Figure 2:
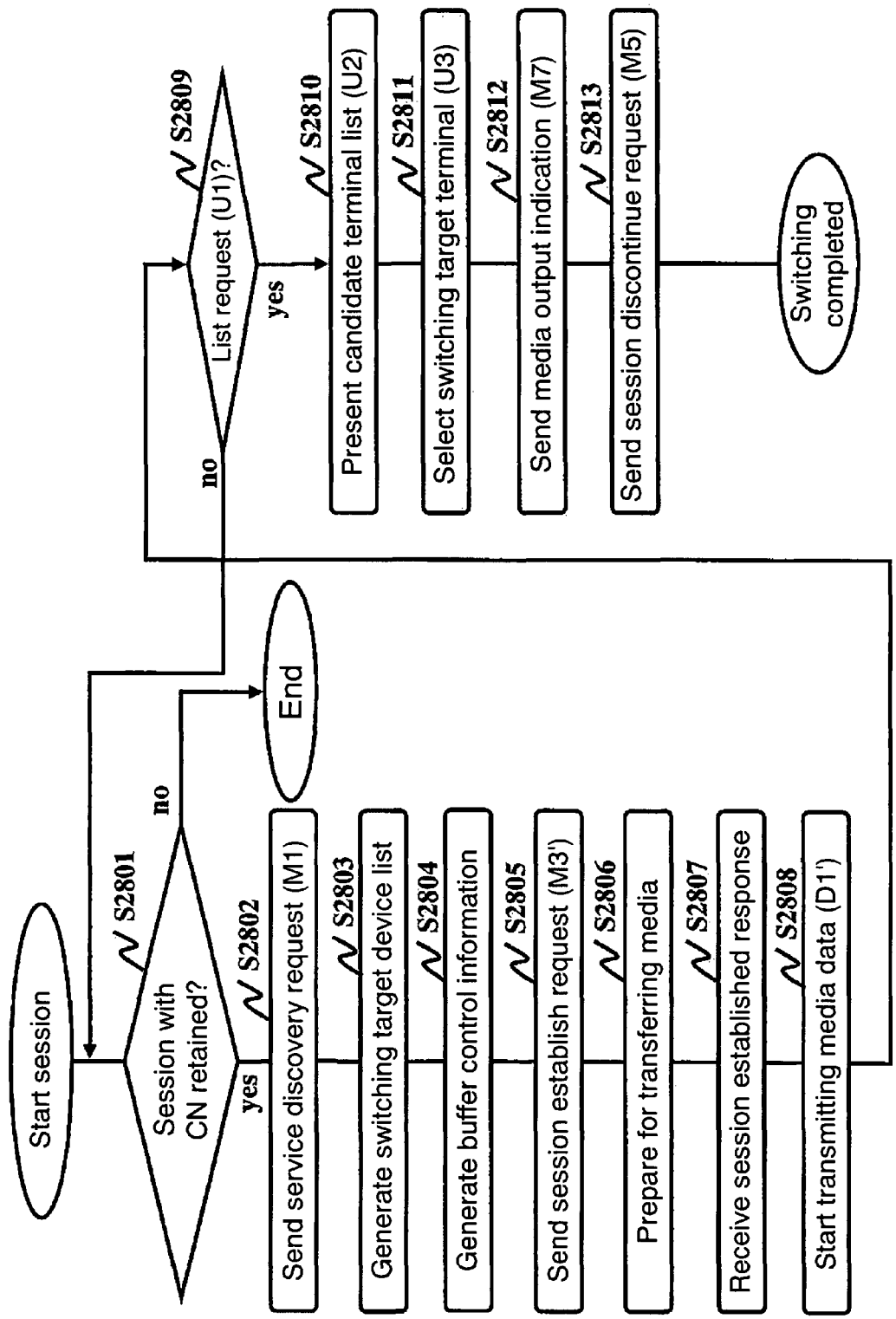
FIG. 2 is a flowchart of operation of the sender devices according to the first embodiment.
Figure 3:
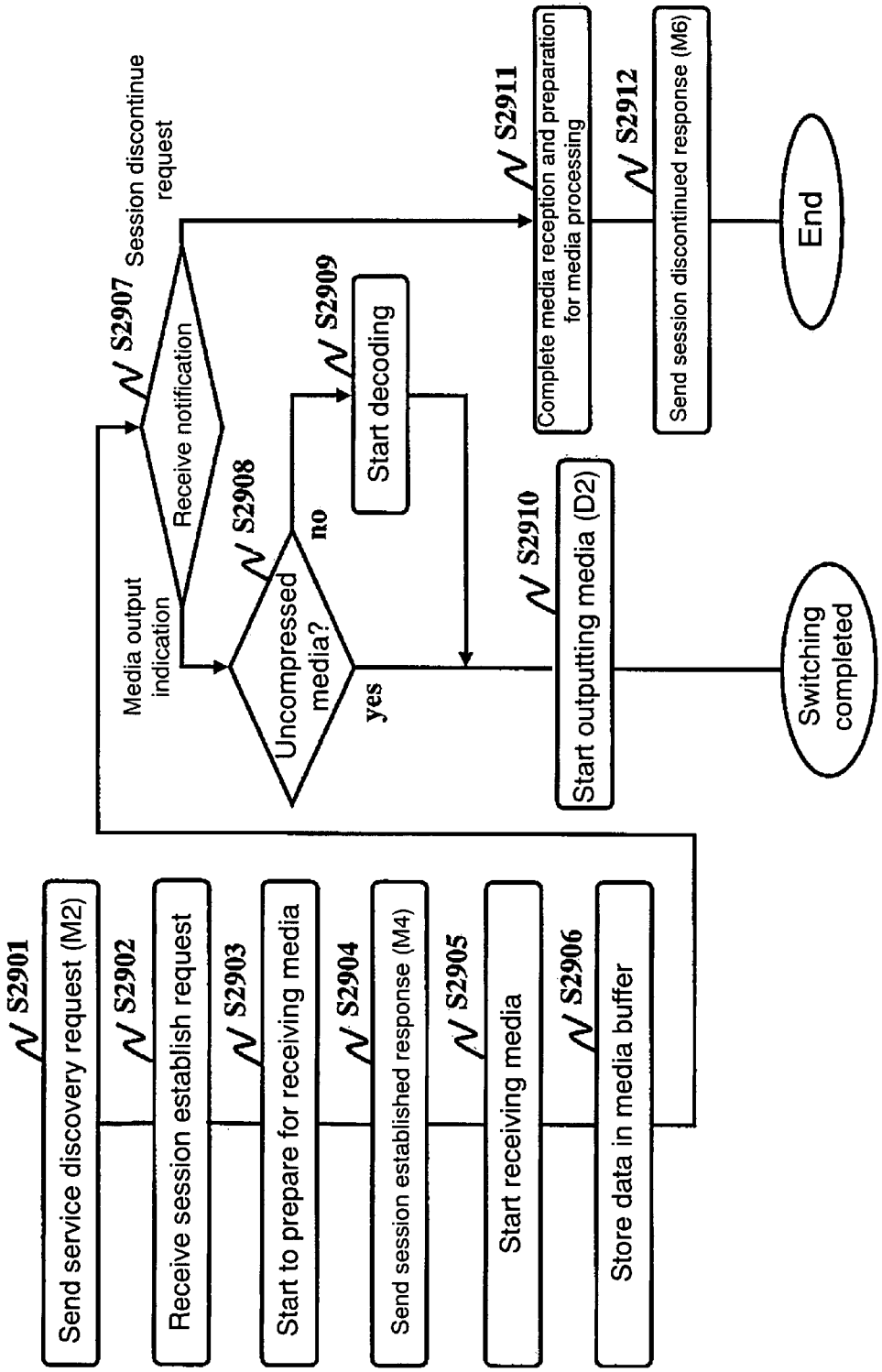
FIG. 3 is a flowchart of operation of a switching target device according to the first embodiment.

FIGS. 1, 2, and 3 are diagrams showing a sequence of messages exchanged between the sender device and a group of switching target devices (FIG. 1), a flowchart showing operation of the sender device (FIG. 2), and a flowchart showing operation of a switching target device (FIG. 3), respectively. It is assumed here that the switching target device group consists of N devices, device 1 to device N. Although not shown, the sender device also has a session with a correspondent node (CN). The fast device switching system alleviates the above-described problems with the techniques in the article "Mobile multimedia middleware for implementing seamless service" in Technical Report of Information Processing Society of Japan ("Mobile computing and wireless communication", 2001, No. 18-35). The sender device and switching target devices of the fast device switching system according to the first embodiment differ from conventional ones in that they have fast middleware, a media buffer 2108, a media transmitter 2106, and a signaling section 2110 that operate differently from conventional counterparts.

Operation of the sender device will be described first with reference to FIG. 2. Redundant description of the same steps in FIG. 2 that have been described with respect to FIG. 19 will be omitted from the following description.

Figure 19:
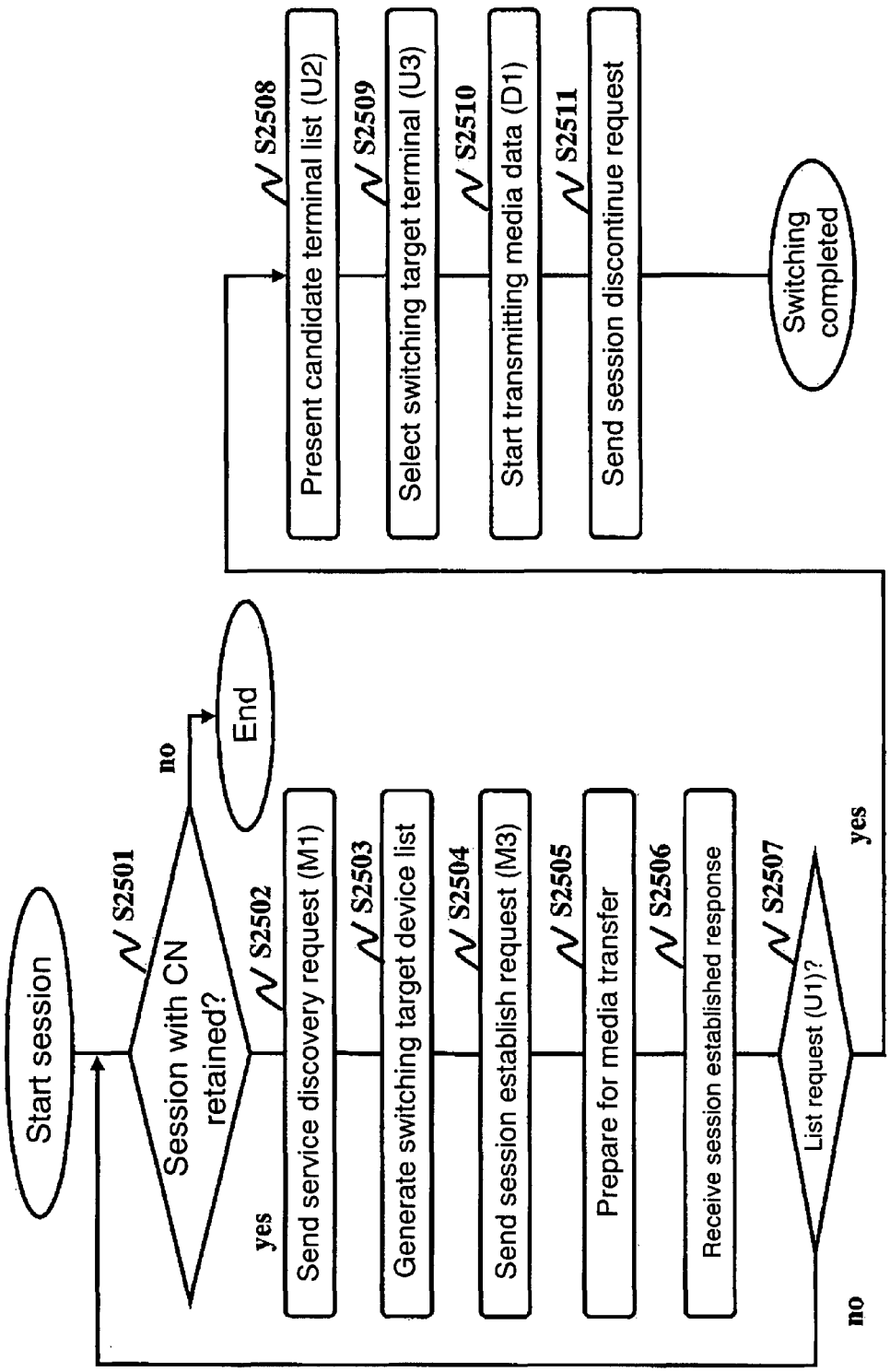
FIG. 19 is a flowchart of operation of a sender device in the sequence according to a technique disclosed in the article "Mobile multimedia middleware for implementing seamless service" in Technical Report of Information Processing Society of Japan ("Mobile computing and wireless communication", 2001, No. 18-35)

The steps, performed by the sender device, of determining whether a session with the CN 2002 is maintained (S2801), sending a service discovery request (M1) simultaneously to all device 1 to N in the PAN at regular intervals (S2802), and generating a device list based on service discovery responses from the candidate switching target devices (S2803) are equivalent to steps S2501 through S2503 shown in FIG. 19.

In the flowchart shown in FIG. 2, the fast middleware causes a buffer controller, not shown, which is provided in the media buffer 2108 to generate buffer control information (S2804) so that candidate switching target devices to which switching can be performed can control their respective media buffers. The fast middleware sends a request to establish a session and prepare for media processing (M3') to the candidate switching target devices through a signaling section 2110 in order to establish sessions with the devices on the switching target device list to transmit media data (S2805). There are n candidate switching target devices (where 1≦n≦N). The middleware adds the buffer control information generated by the buffer controller to the payload of the request to prepare for media processing (M3'). The buffer control information may be added to the header, instead of the payload.

At the same time, the fast middleware directs its media receiver 2107 and media transmitter 2106 to start preparation for transferring received media data and the media data stored in the media buffer 2108 to the candidate switching target devices (S2806). When the signaling section 2110 receives a session established and prepared for media processing response from a candidate switching target device (S2807), the fast middleware directs the media transmitter 2106 to start transmitting the media data received by the media receiver 2107 from the CN 2002 (D1') (S2808). The media transmitter 2106 multicasts or broadcasts the media data to the candidate switching target devices on the switching target device list and the fast middleware waits a predetermined amount of time.

While waiting, the fast middleware determines whether a request to list switching target devices (U1) is issued by the user (S2809). If it determines that the request is issued by the user (S2809: Yes), the process proceeds to step S2810 to S2811 (which are equivalent to steps S2508 and S2509 in FIG. 19), and then the fast middleware sends a media output indication (M7) to a selected switching target, "Device 2", through the signaling section 2110 (S2812) so that "Device 2" starts outputting the media. At this step, the fast middleware adds information indicating the state of the media data in the media buffer 2108, which is generated by the buffer controller, to the payload of the media output indication (M7). The information indicating the state of the media data may be added to the header instead of the payload. The fast middleware then sends a session discontinue request (M5) to all candidate switching target devices other than the switching target "Device 2" through the signaling section 2110 (S2813), receives a session discontinued response (M6) from the devices, and then ends the switching operation.

Figure 20:
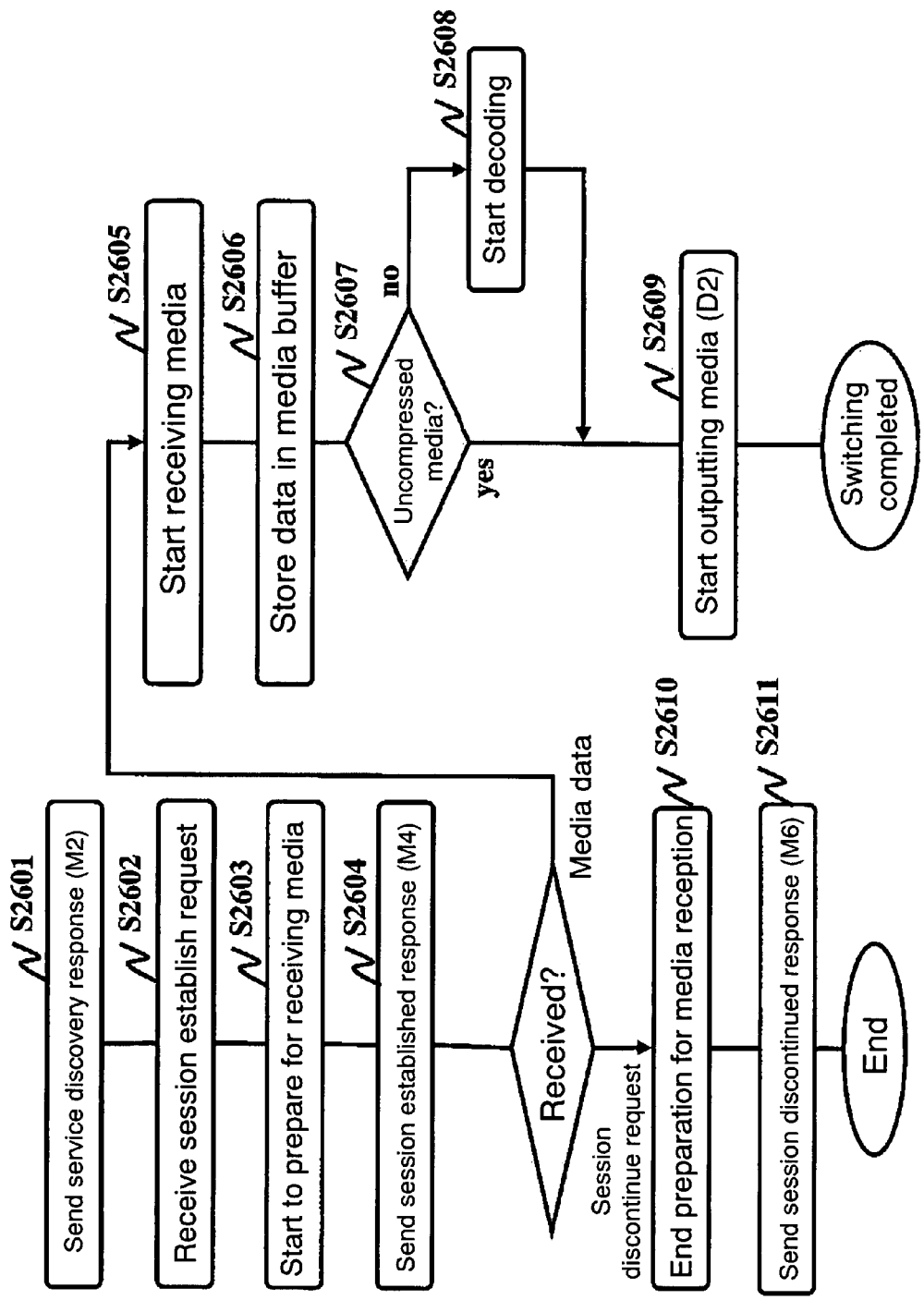
FIG. 20 is a flowchart of operation of a switching target device in the sequence according to the technique disclosed in the "Mobile multimedia middleware for implementing seamless service" in Technical Report of Information Processing Society of Japan ("Mobile computing and wireless communication", 2001, No. 18-35).

Operation of a switching target device will be described next with reference to FIG. 3. Redundant description of the steps in FIG. 3 that have been described with respect to FIG. 20 will be omitted.

In the flowchart shown in FIG. 3, the service discovery section 2111 of a candidate switching target device that has received a service discovery request sends (returns) a service discovery response (M2) to MN 2001 (S2901). The signaling section 2110 of the candidate switching target device receives a request to establish a session and prepare for media processing ("Session establish request" in FIG. 3) from MN 2001 (S2902). The steps described so far are equivalent to steps S2601 and S2602 shown in FIG. 20.

When the signaling section 2110 of the candidate switching target device receives the request to establish session and prepare for media processing from the sender device, the signaling section 2110 extracts the buffer control information from the message and provides it to the fast middleware (S2903). On completion of media processing preparation, the candidate switching target device sends a session established and prepared for media processing response (M4) to the sender device as in step S2604 shown in FIG. 20 (S2904).

The media receiver 2107 of the candidate switching target device receives media data transferred from the sender device through broadcast or multicast (S2905) and starts buffering of the media data in the media buffer 2108 (S2906). At step S2906, the fast middleware provides the buffer control information to the buffer controller, not shown, provided in the media buffer 2108 and the buffer controller uses the information to control the media buffer 2108 so that the media buffer 2108 assumes the same state as the media buffer of the sender device.

When the fast middleware of the candidate device receives the indication sent from the sender device through the signaling section 2110, the fast middleware interprets the indication (S2907) and performs processing according to the indication. If the fast middleware receives a media output indication (M7), the fast middleware recognizes that the device is selected as a switching target device to which switching is to be performed, and starts processing as such a device. The fast middleware then sends information indicating the state of the media data attached to the media output indication (M7) to the buffer controller. The buffer controller uses the information to control the media buffer 2108 so that the media buffer 2108 assumes the same state as the media buffer of the sender device. Then, the fast middleware determines whether the buffered media data is uncompressed data (S2908). If the media data is compressed (S2908: No), the fast middleware directs the decoder section 2109 to start decoding and the decoder section 2109 decodes the data (S2909). On the other hand, if the media data is uncompressed (S2909: Yes), the media data is directly provided to the output section 2103 via an operating system 2105, which operation is equivalent to steps S2607 through step S2609 shown in FIG. 20.

If the signaling section 2110 of the candidate switching target device receives a session discontinue request (M5) sent from the sender device, the fast middleware directs the media receiver 2107 to discontinue receiving the media data. The fast middleware also directs the media buffer 2108 and the decoder section 2109 to discontinue the preparation for media processing (S2911). The fast middleware sends a session discontinued response to the sender device (S2902).

In this way, switching from the sender device to the switching target device in the fast device switching system of the first embodiment can be performed so fast that the user practically cannot perceive the switching delay.

Second Embodiment

A fast device switching system capable of fast switching of interframe compressed video picture data between devices will be described with respect to a second embodiment. Decoding of interframe-compressed video picture data can be only started at an intraframe, that is, a frame that is a frame compressed independently of another frame and inserted in a frame sequence at certain intervals (for example at intervals of 30 frames). The fast device switching system described below with respect to the subsequent embodiments is capable of immediately starting to decode interframe-compressed video picture data such as MPEG data even if device switching timing is not coincident with reception timing of an intraframe. Thus, device switching can be performed so fast that the user will not perceive the switching delay.

Figure 14:
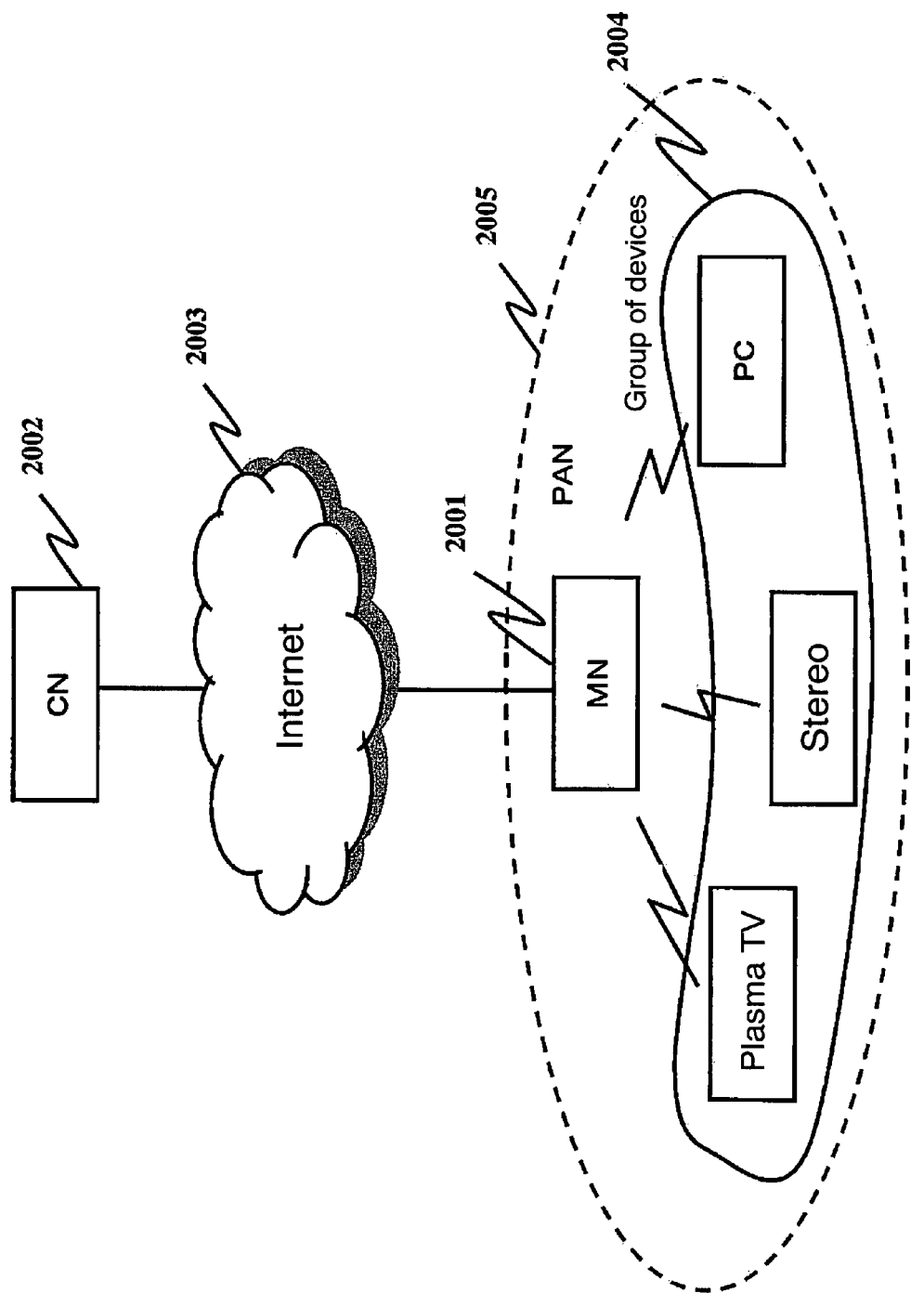
FIG. 14 is a diagram illustrating a typical configuration of a conventional device switching system.

The basic configuration of the fast device switching system of the second embodiment is the same as the configuration shown in FIG. 14, except that the internal configuration and operation of terminals constituting device group 2004 to which switching is performed. In particular, the internal configuration and operation of the decoder sections 2109 of switching target devices differ from those in conventional fast device switching systems. The internal configuration and operation enable decoding of interframe-compressed video picture data such as MPEG data to be started at any frame immediately upon switching. Thus, device switching can be made so fast that the user cannot perceive the switching delay. The internal configuration and operation of a switching target device will be described below in detail.

Figure 4:
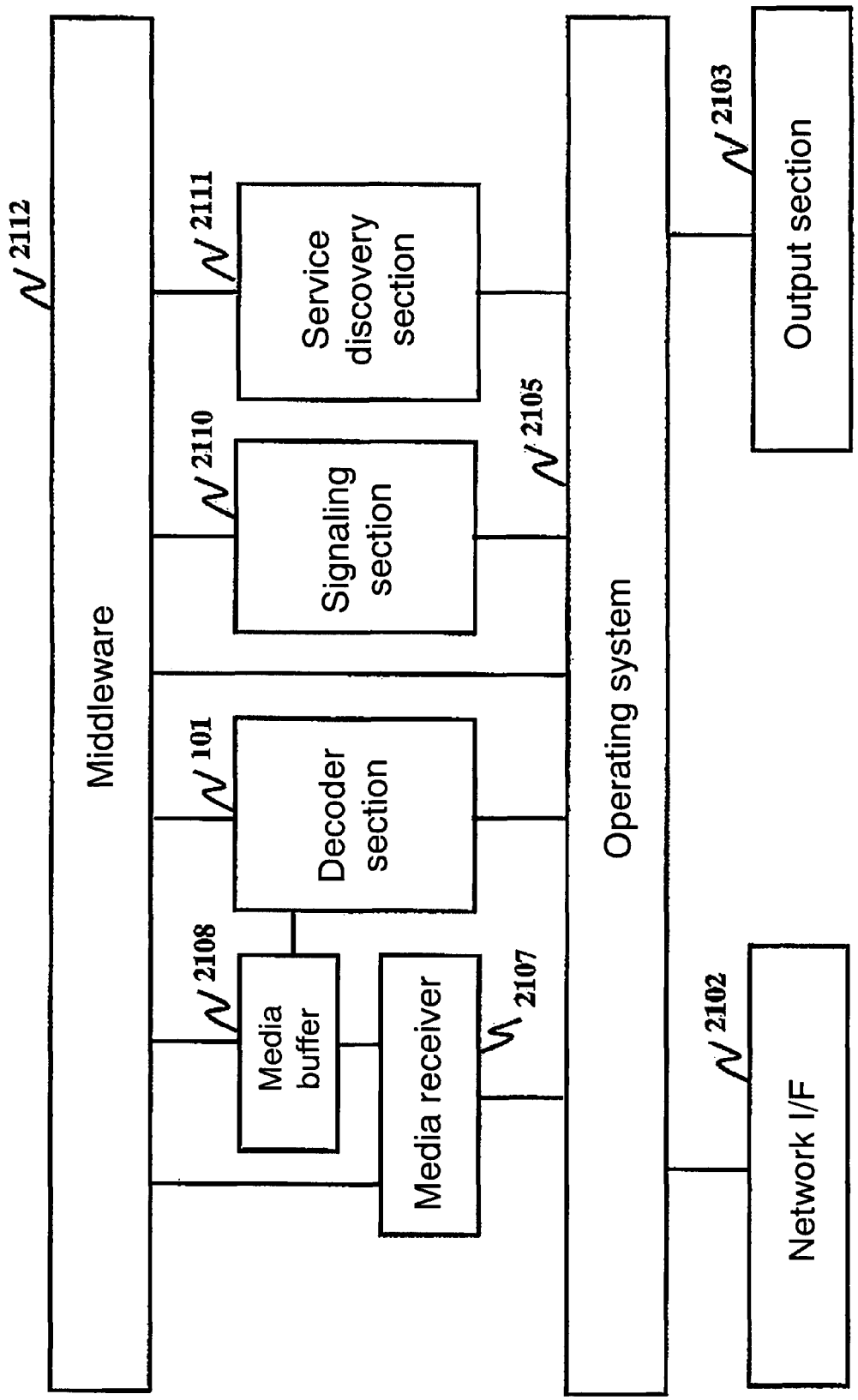
FIG. 4 shows an internal configuration of a switching target device provided in a fast device switching system according to a second embodiment.
Figure 15:
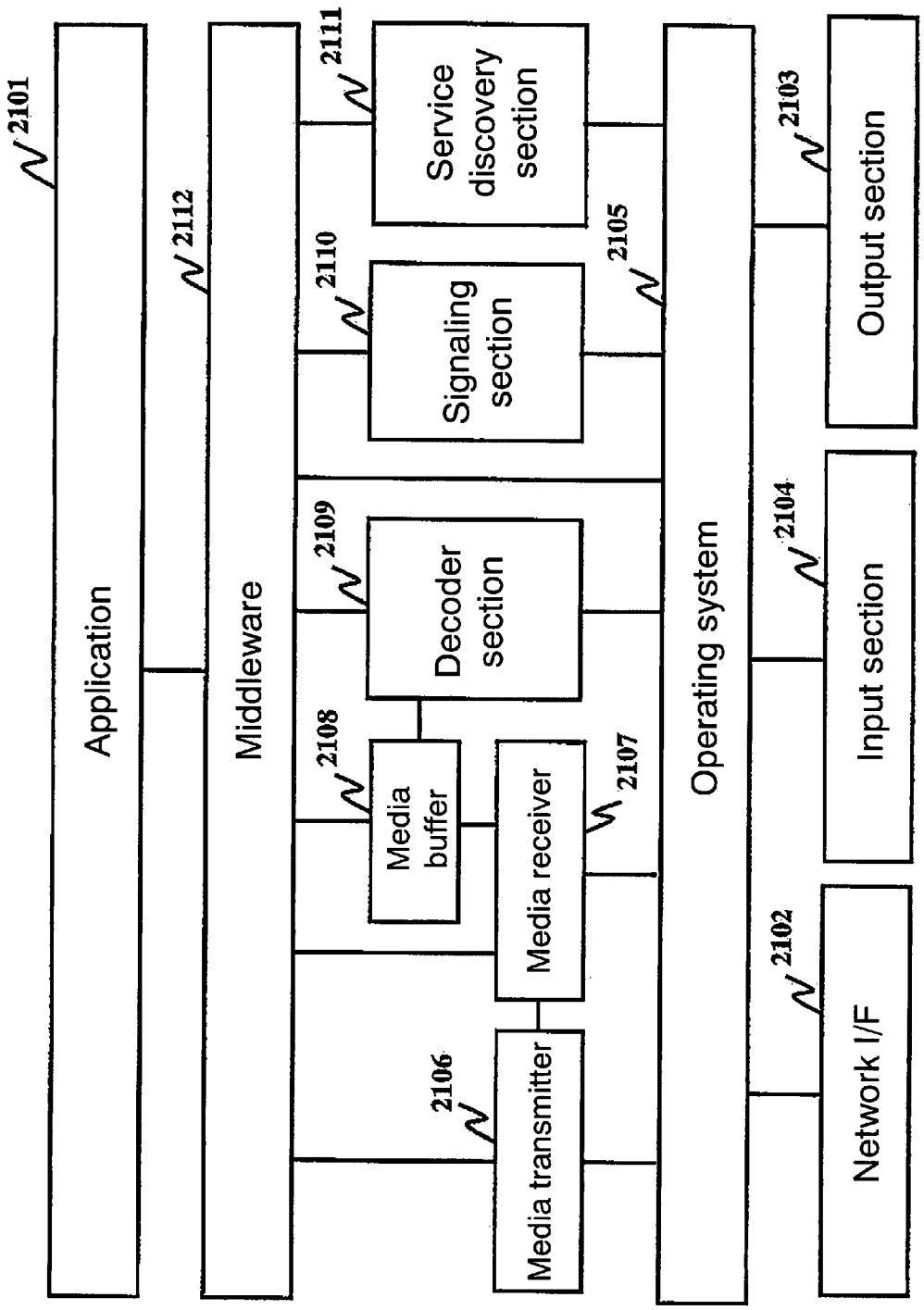
FIG. 15 is a block diagram illustrating an exemplary internal configuration of a mobile node (MN) device for implementing device switching.
Figure 16:
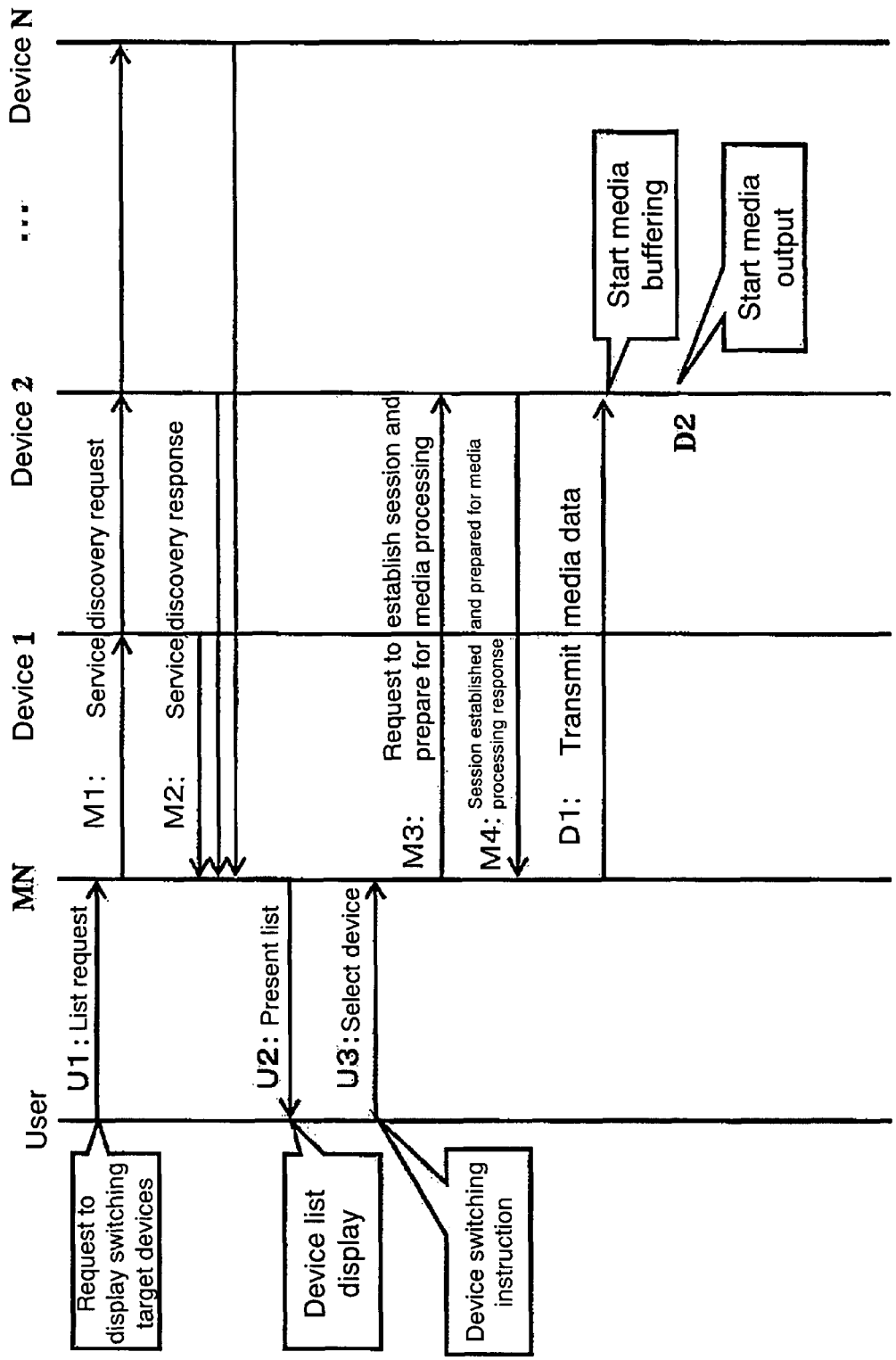
FIG. 16 shows a message sequence between a mobile node and switching target devices.
Figure 17:
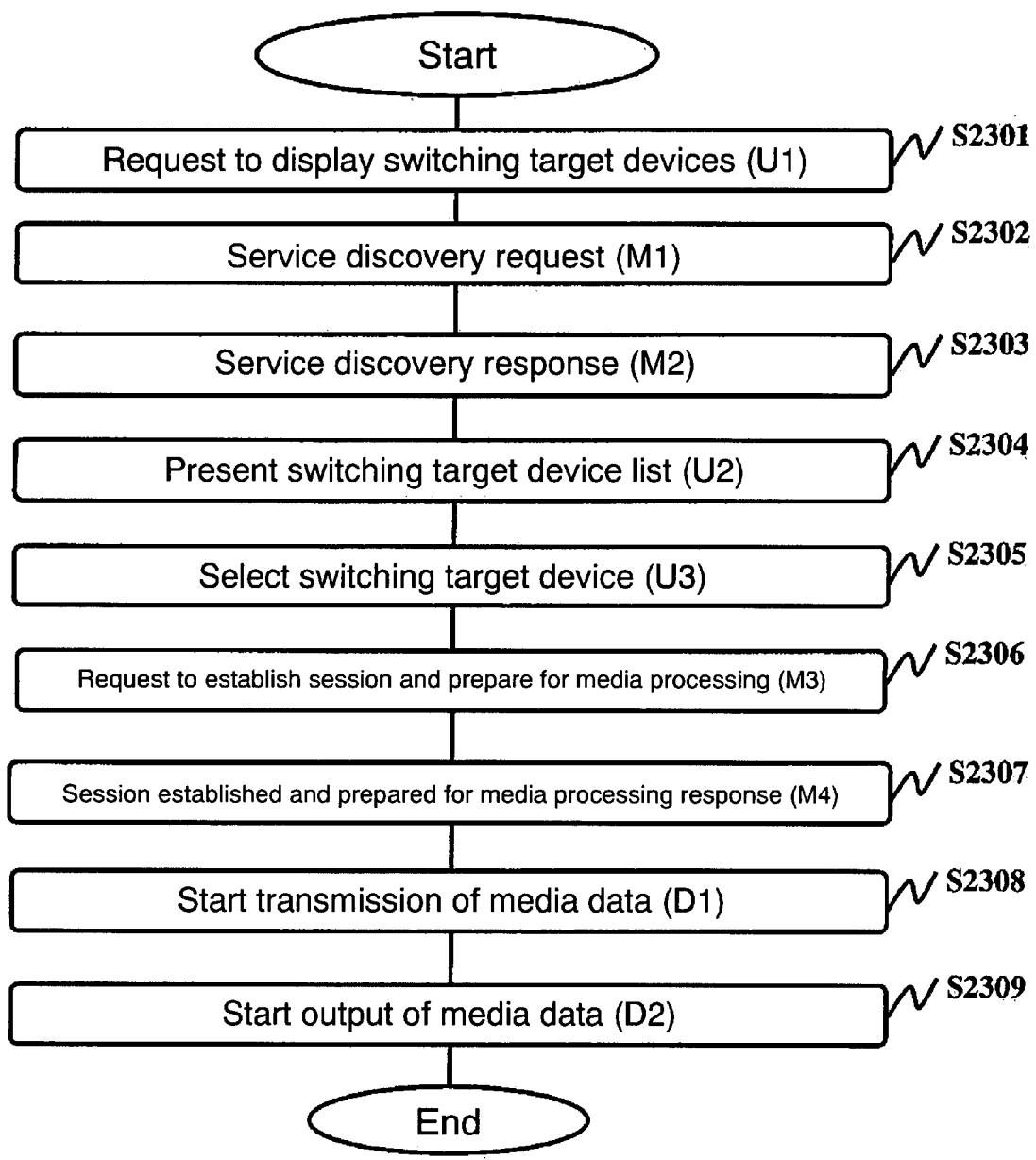
FIG. 17 is a flowchart of the message sequence shown in FIG. 16.
Figure 18:
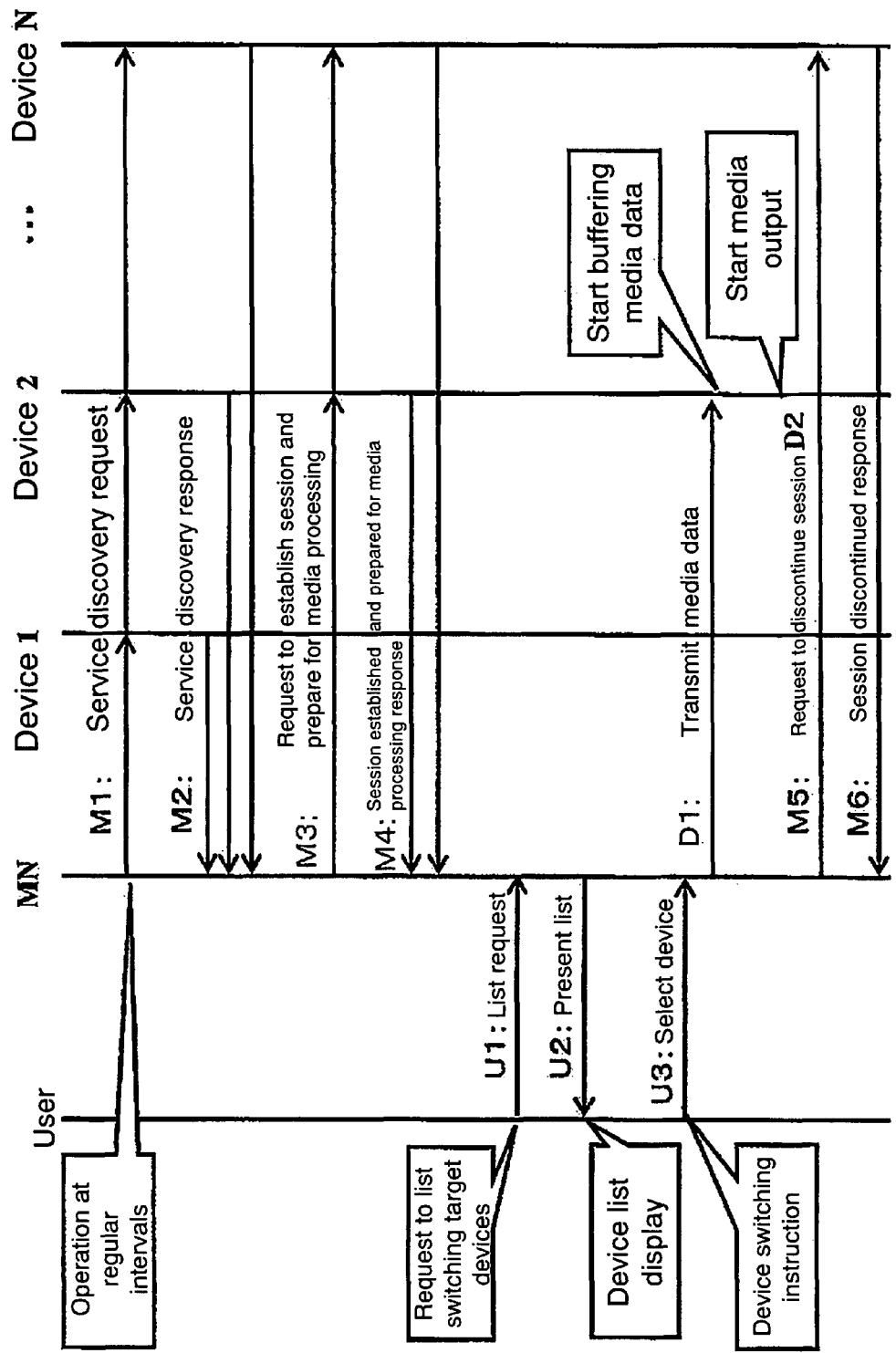
FIG. 18 shows a message sequence between a mobile node and switching target devices according to a technique disclosed in the article "Mobile multimedia middleware for implementing seamless service" in Technical Report of Information Processing Society of Japan ("Mobile computing and wireless communication", 2001, No. 18-35)

FIG. 4 shows an internal configuration of a switching target device provided in the fast device switching system according to the second embodiment. The same components in FIG. 4 as those of the conventional device shown in FIG. 15 are labeled with the same reference numerals. The conventional device in FIG. 15 has a configuration capable of functioning not only as a switching target device but also as a sender device from which switching can be performed to another device. In contrast, the switching target device of the second embodiment has only the functions required for functioning as a sender device to which switching can be performed and does not have an application 2101, an input section 2104, and a media transmitter 2106 which are not required for functioning as a switching target device. The decoder section 101 of the switching target device of the second embodiment differs from conventional ones.

Figure 5:
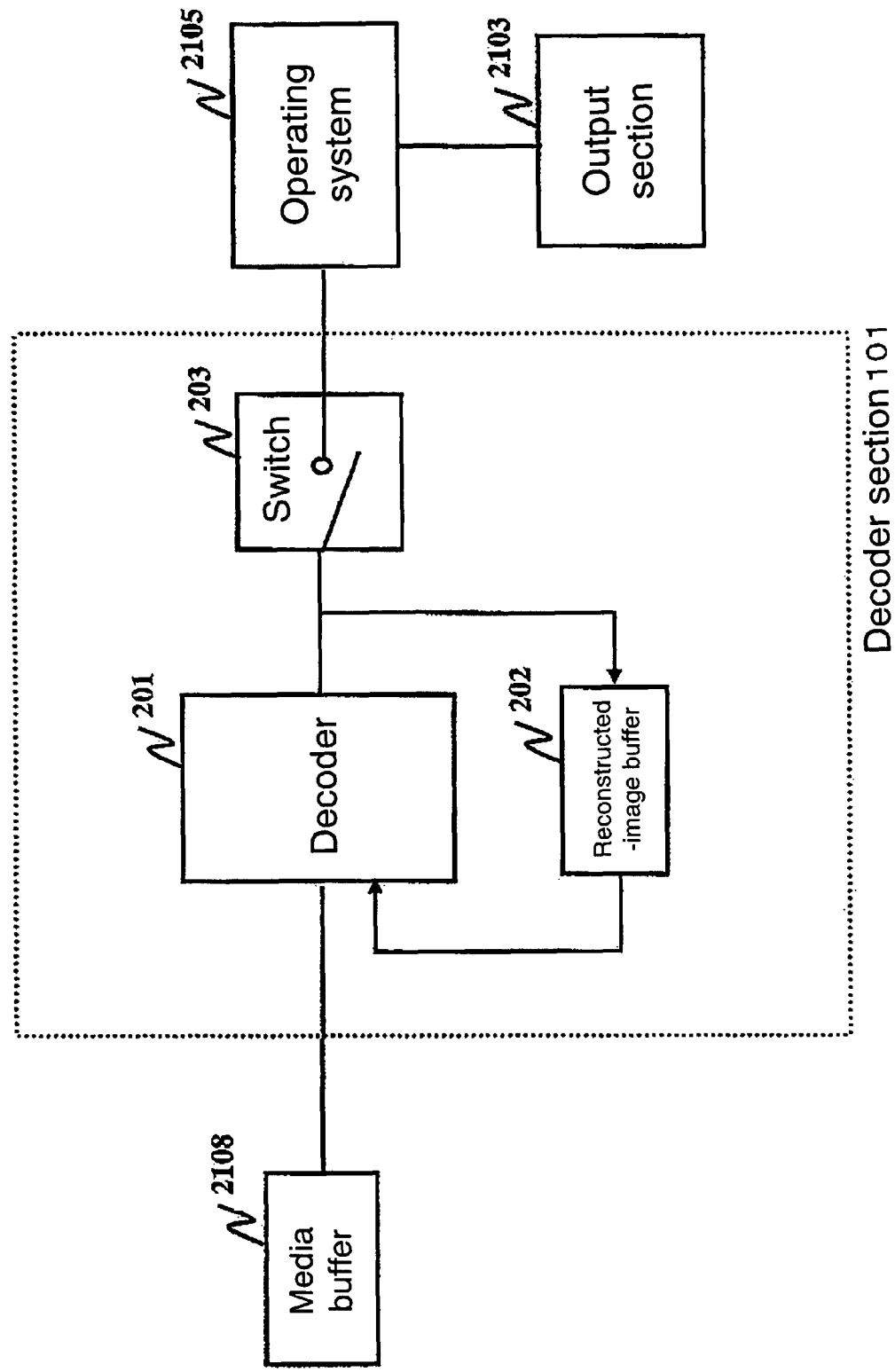
FIG. 5 shows an internal configuration of a decoder section according to the second embodiment.

FIG. 5 shows an internal configuration of a decoder section 101 according to the second embodiment. The decoder section 101 includes a decoder 201 which decodes video picture data, a reconstructed-image buffer 202 which holds a decoded reconstructed image for decoding the succeeding video picture data, and a switch 203 which controls a reconstructed image decoded by the decoder 201 to prevent the image from flowing out of the decoder section 101 and being displayed on the output section 2103. For facilitating the understanding of the operation, how interframe-compressed video picture data is decoded in a switching target device in the fast device switching system according to the second embodiment will be described before describing the internal operation of the decoder section 101.

Figure 6:
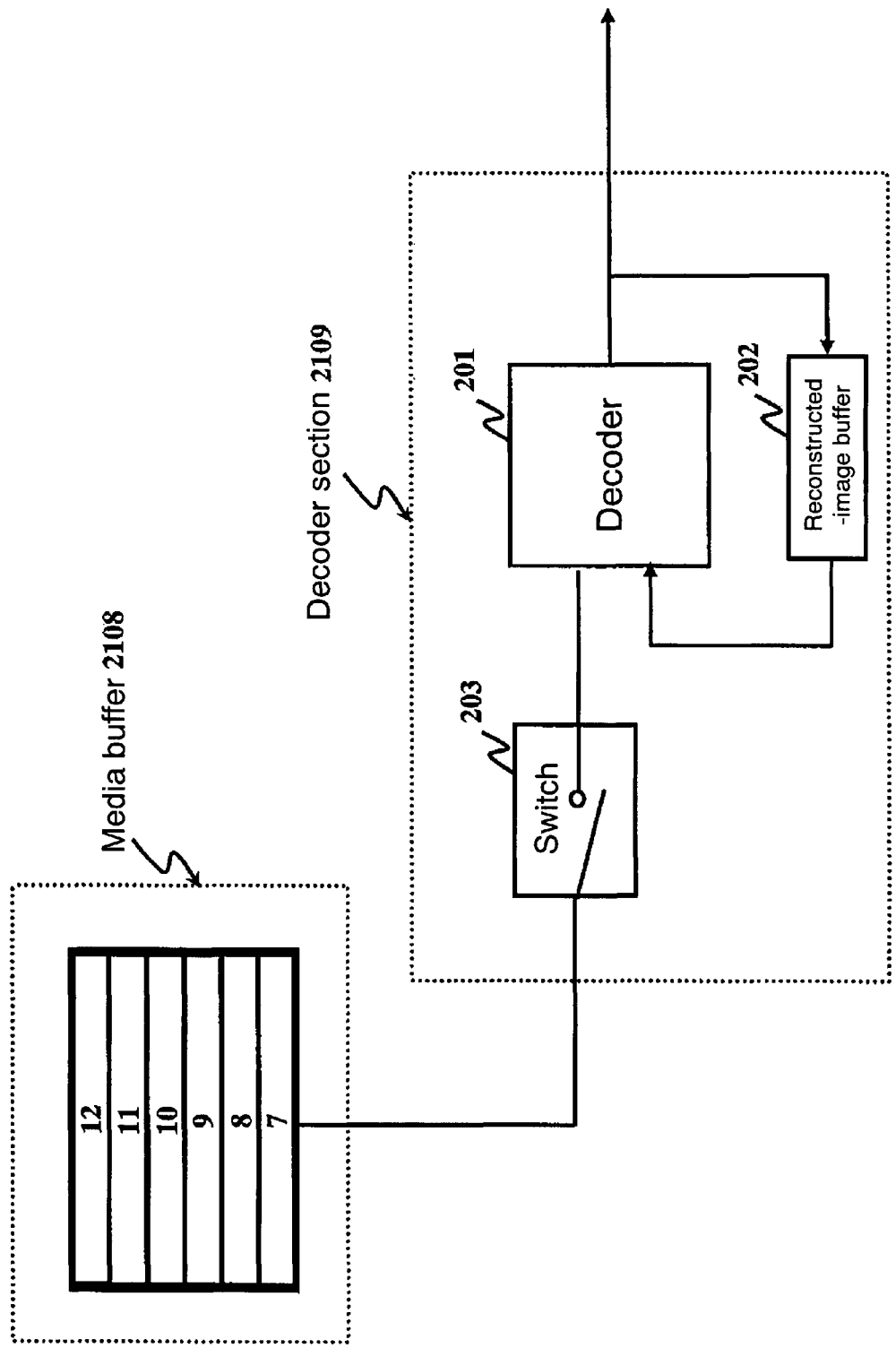
FIG. 6 is a diagram for illustrating how an interframe-compressed video picture is decoded in a switching target device according to the first embodiment.

FIG. 6 shows an internal configuration of media buffer 2108 and the conventional decoder section 2109 shown in FIG. 15. Comparing the configuration of the second embodiment with the configuration shown in FIG. 6, decoding of interframe-compressed video picture in the switching target device of the second embodiment will be describe below.

The media buffer 2108 stores video picture data (7-12). For purpose of illustration, numbers are assigned to the pieces of video picture data in the media buffer 2108, which are the numbers of compressed image frames. That is, frames 7 to 12 are stored in this order.

The media buffer 2108 is controlled on FIFO (First-In First-Out) basis, meaning that when a new image frame arrives, the oldest data, frame 7, is outputted. The decoder section 2109 includes a decoder 201, a reconstructed-image buffer 202, and a switch 203, which are the same as those used in the second embodiment shown in FIG. 5. When the switch 203 is in the on state, image data is inputted into the decoder 201, where it is decoded. The decoded reconstructed image is outputted to the outside of the decoder section 2109 and at the same time is held in the reconstructed-image buffer 202.

To decode an interframe-compressed image data that is not an intraframe, a reconstructed image generated by decoding the frame preceding the frame to be decoded is required. If frame 7 in the media buffer 2108 in FIG. 6 is not an intraframe, the reconstructed image of frame 6 must be used in order to decode frame 7. If frame 7 is an intraframe, a reconstructed image is not required. Frame 7 can be directly decoded in its own.

When the switching target device in the fast device switching system of the second embodiment receives a media output indication (M7) from the sender device, the switch 203 is turned on and decoding is started (step S2909 in FIG. 3). At this time point, no reconstructed image is held in the reconstructed-image buffer 202. As described above, if frame 7 is not an intraframe, decoding of image data is not performed until the subsequent intraframe is inputted into the decoder 201. The image data received up to that time is discarded by the decoder 201.

Returning to FIG. 5, internal operation of the decoder section 101 of the second embodiment will be described. Outputs from the media buffer 2108 are always inputted into the decoder 201. Once an intraframe is inputted in the decoder 201, the decoder 201 starts to decode and stores are constructed image obtained by decoding into the reconstructed-image buffer 202. When the next interframe (a non-intraframe) is inputted, the reconstructed image held in the reconstructed-image buffer 202 is used to decode that interframe and a new, decoded reconstructed image obtained as a result of the decoding is stored in the reconstructed-image buffer 202. The previous reconstructed image held is overwritten by the new image.

In this way, the reconstructed-image buffer 202 always holds a reconstructed image required for decoding image data outputted from the media buffer 2108. Accordingly, regardless of whether video picture data inputted from the media buffer 2108 is an intraframe or not, the decoder 201 can immediately start decoding. On the other hand, when the switching target device of the second embodiment receives a media output indication (M7) from the sender device, the switch 203 is turned on and are constructed image decoded by the decoder 201 is sent by the operating system 2105 to the output section 2103, where the image is displayed.

In this way, a switching target device provided in the fast device switching system according to the present embodiment is capable of starting to decode interframe-compressed video picture data such as MPEG data at a frame where device switching occurred, thereby enabling device switching so fast that the user will not perceive the switching delay.

Third Embodiment

The basic configuration of a fast device switching system according to a third embodiment is the same as that shown in FIG. 14, except for the internal configuration and operation of switching target terminals constituting a device group 2004. The third embodiment enables quick starting of decoding of interframe-compressed video picture data such as MPEG data at a frame where device switching occurred, thereby enabling device switching so fast that the user will not perceive the switching delay. The internal configuration and operation of the decoder section 101 of switching target devices in the third embodiment differ from those of the system of the second embodiment.

Figure 7:
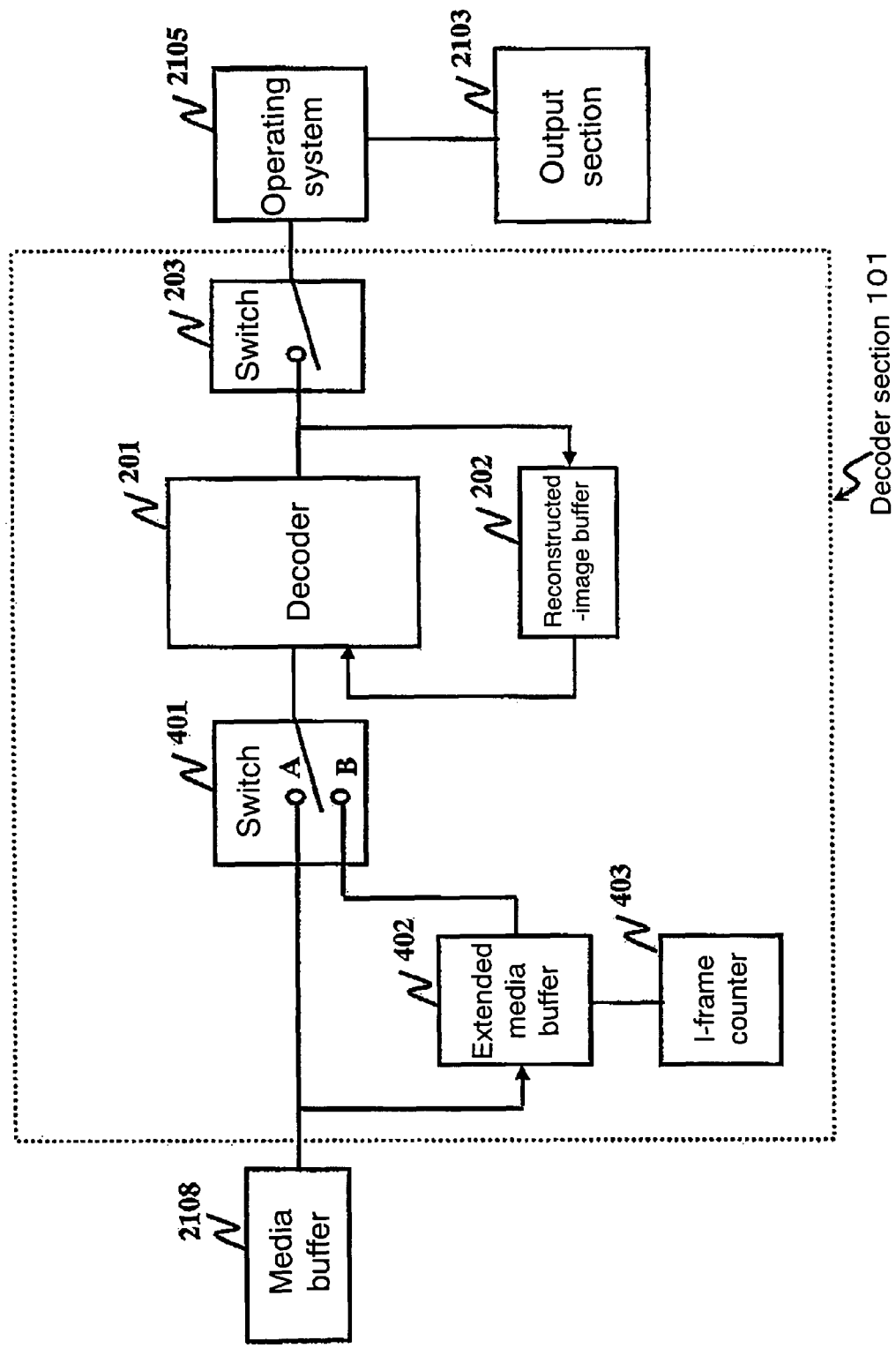
FIG. 7 shows an internal configuration of a decoder section according to a third embodiment.

FIG. 7 shows an internal configuration of a decoder section 101 of the third embodiment. The same components in FIG. 7 as those of the decoder 101 shown of the second embodiment shown in FIG. 5 are labeled with the same reference numerals. The decoder section 101 of the third embodiment includes: an extended media buffer 402 for storing multiple frames of video picture data; an I-frame (synonymous with an intraframe) counter 403 which identifies the types of frames of video picture data and, when an I-frame is inputted in the extended media buffer 402, resets the buffer; a switch 401 which can switch between three states, namely a state in which it is connected to contact A, a state in which it is connected to contact B, and the off state; a decoder 201 which decodes video pictures, a reconstructed-image buffer 202 which holds a decoded reconstructed image used for decoding the succeeding frame, and a switch 203 which controls a reconstructed image decoded by the decoder 201 to prevent the image from flowing out of the decoder section 101 and being displayed on an output section 2103.

Internal operation of the decoder section 101 according to the third embodiment will be described below. According to the third embodiment, outputs from the media buffer 2108 are always inputted in the extended media buffer 402. The extended media buffer 420 stores image data on FIFO control basis. The I-frame counter 403 monitors the type of image data inputted into the extended media buffer and, when an I-frame is inputted in the extended media buffer 402, resets the buffer. In other words, image data is stored in the extended media buffer 402 in such a manner that an I-frame is always contained in the extended media buffer 402 and the I-frame is at the top of the buffer (as the first frame to be outputted). Contact A of the switch 401 is connected to the media buffer 2108 and contact B is connected to the extended media buffer 402. Until device switching occurs, the switch 401 is connected to neither contact A nor B. That is, data is not inputted in the decoder 201. Therefore, unlike the decoder of the system of the second embodiment, the decoder 201 does not operate until device switching occurs.

When the switching target device of the third embodiment receives a media output indication (M7) from the sender device, the switch 401 connects with contact B so that all image data stored in the extended media buffer 402 is inputted into the decoder 201, starting from the first frame (I-frame). The decoder 201 decodes the image data, starting from the first frame (I-frame), and holds a reconstructed image obtained as a result of the decoding in the reconstructed-image buffer 202. During this decoding, the switch 203 is in the off state and therefore the reconstructed image is not outputted from the decoder section 101. After the last frame stored in the extended media buffer 402 is decoded, the switch 401 connects with contact A. At the same time, the switch 203 is turned on. By improving the throughput of the decoder 201 in this way, all frames stored in the extended media buffer 402 can be decoded in a very short time, for example a time shorter than a typical frame interval.

By this operation, the reconstructed image required for decoding video picture data outputted from the media buffer 2108 is held in the reconstructed-image buffer 202. Thus, regardless of whether the video picture data inputted from the media buffer 2108 at the time of device switching is an intraframe or not, the decoder 201 can immediately start decoding the data.

In this way, the switching target device in the fast switching system according to the third embodiment can start decoding data from the frame where device switching occurred, even if the data is interframe-compressed video picture data such as MPEG data. Thus, device switching can be accomplished so fast that the user will not perceive the switching delay. Furthermore, the fast switching system according to the third embodiment has the effect of saving electric power because the decoder 201 is not required to be activated until device switching.

Fourth Embodiment

A fast device switching system according to a fourth embodiment of the present invention will be outlined below. The basic configuration of the system is the same as that shown in FIG. 14, except for the internal configuration and operation of a switching source device, MN 2001, and switching target terminals constituting a device group 2004. This configuration and operation enable quick starting of decoding of interframe-compressed video picture data such as MPEG data at a frame where device switching occurred, thereby enabling device switching so fast that the user will not perceive the switching delay.

Figure 8:
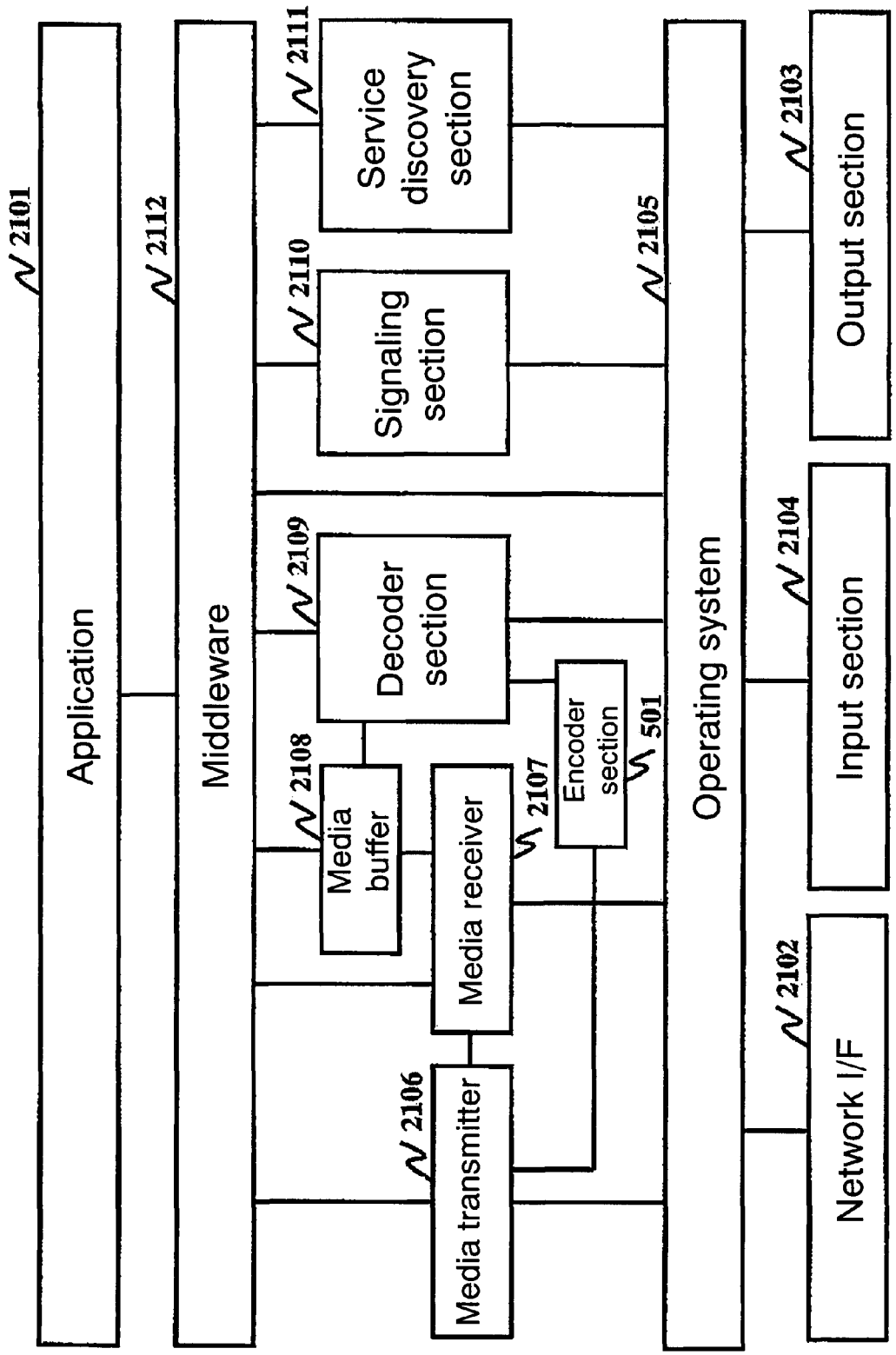
FIG. 8 shows a configuration of a current terminal from which switching is made according to a fourth embodiment.

FIG. 8 shows a configuration of a switching source terminal from which switching is made according to the fourth embodiment. In the fourth embodiment, an encoder section 501 is newly added which re-encodes a reconstructed image decoded by a decoding section 2109 and provides the re-encoded image to a media transmitter 2106. The same components of devices already described are labeled with the same reference numerals.

Figure 9:
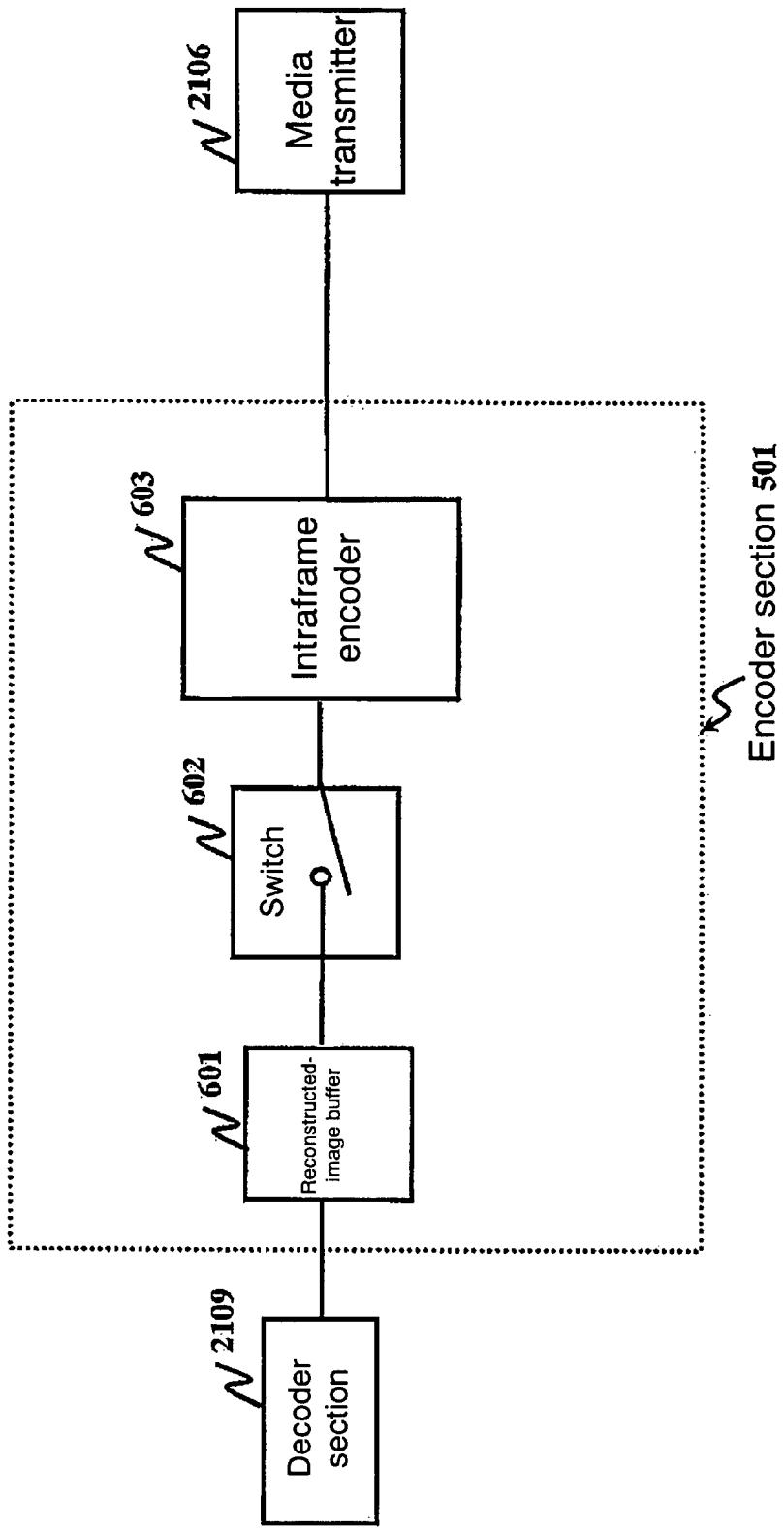
FIG. 9 shows an internal configuration of an encoder section in a first implementation according to the fourth embodiment.

FIG. 9 shows an internal configuration of the encoder section 501 according to the fourth embodiment (in the first implementation). The encoder section 501 includes a reconstructed-image buffer 601 for holding a reconstructed image decoded by a decoding section 2109, a switch 602, and an intraframe encoder 603 for encoding the reconstructed image as an intraframe. The reconstructed-image buffer 601 and the switch 602 are the same as the reconstructed-image buffer 202 and switch 203, respectively, in the second embodiment.

An internal operation of the encoder section 501 according to the fourth embodiment will be described below. According to the fourth embodiment, outputs from the decoder section 2109 are always inputted in the encoder section 501 as well and the latest decoded reconstructed image is held in the reconstructed-image buffer 601. The reconstructed image is the same as the reconstructed image held in a reconstructed-image buffer, not shown, provided within the decoder section 2109 of the switching source device.

The switch 602 is normally in the off state and is turned on upon device switching. Once the switch 602 is turned on, the reconstructed image held in the reconstructed-image buffer 601 is sent to the intraframe encoder 603, where the image is intraframe-coded to generate an I-frame. The I-frame is sent to a media transmitter 2106, where the I-frame is attached to the payload of a media output indication message (M7), and is transmitted to switching target devices (step S2812 in FIG. 2).

In this way, the switching source device according to the fourth embodiment applies intraframe encoding to a reconstructed image required for the switching target device to decode a frame when the switching occurred and transmits the intraframe encoded image (I-Frame) to the switching target device.

A switching target device which receives an intraframe-compressed reconstructed image (I-frame) sent from the switching source device will be described next.

Figure 10:
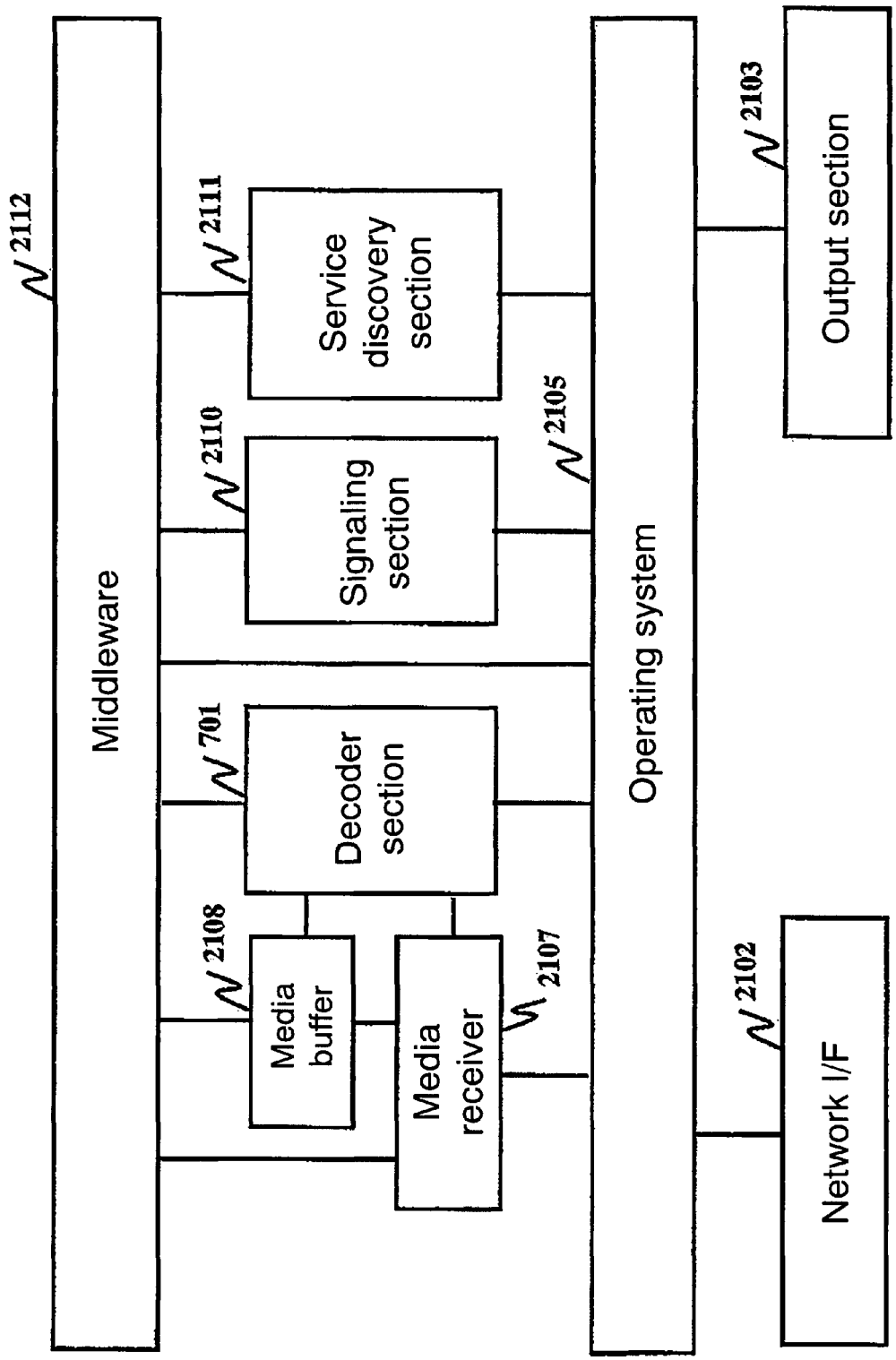
FIG. 10 is a diagram illustrating a configuration of a switching target device according to the fourth embodiment.

FIG. 10 illustrates a configuration of a switching target device according to the fourth embodiment. The same components in FIG. 10 as those of the switching target device according to the second embodiment shown in FIG. 4 are labeled with the same reference numerals. The switching target device according to the fourth embodiment differs from the switching target device of the second embodiment in the internal configuration and operation of the decoder section 701. The decoder section 701 is connected to a media receiver 2107 so that the decoder section 701 can receive image data from the media receiver 2107.

Figure 11:
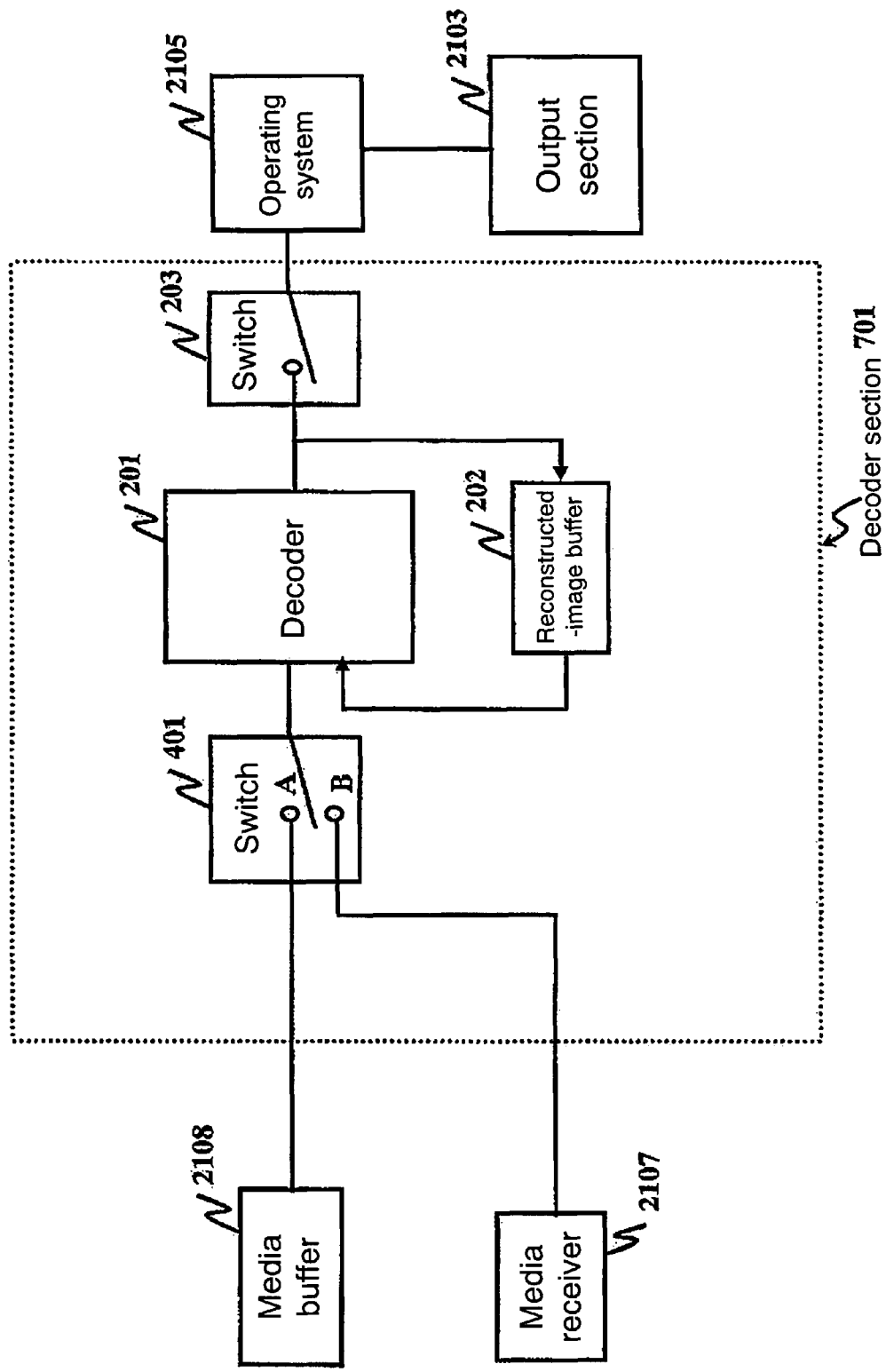
FIG. 11 shows an internal configuration of the decoder section in the first implementation according to the fourth embodiment.

FIG. 11 shows an internal configuration of the decoder section 701 according to the fourth embodiment (in the first implementation). The same components in FIG. 11 as those of the decoder section of the second embodiment shown in FIG. 5 or those of the decoder section of the third embodiment shown in FIG. 7 will be labeled with the same reference numerals.

The decoder section 701 of the fourth embodiment includes: a switch 401 which can be in any of three states, namely a state in which it is connected with contact A, a state in which it is connected with contact B, and a state in which it is not connected to any of the contacts; a decoder 201 for decoding video picture data, a reconstructed-image buffer 202 which holds decoded reconstructed image for use in decoding the succeeding video picture data, and a switch 203 which controls a reconstructed image decoded by the decoder 201 to prevent the image from flowing out of the decoder section 701 and being displayed on the output section 2103.

An internal operation of the decoder section 701 according to the fourth embodiment will be described below. According to the fourth embodiment, contact A of the switch 401 is connected to the output of the media buffer 2108 and contact B of the switch 401 is connected to the output of the media receiver 2107. The switch 401 is not connected to any of contacts A and B until device switching occurs. That is, the data is not inputted in the decoder 201 and therefore the decoder 201 does not operate in the fourth embodiment as in the third embodiment.

According to the fourth embodiment, when the switching target device receives a media output indication (M7) from the switching source device, the switch 401 connects with contact B, and the media receiver 2107 separates an intraframe-coded image (I-frame) attached to the payload of the media output indication message (M7) from the payload and sends the I-frame to the decoder 201. The decoder 201 decodes the I-frame and holds the decoded reconstructed image in the reconstructed-image buffer 202. During this operation, the switch 203 is in the off state and, accordingly, the reconstructed image is not outputted from the decoder section 701. The I-frame has been generated at the switching source device by intraframe-coding a reconstructed image required for decoding the top frame (the first frame to be outputted) in the media buffer 2108. By decoding the I-frame, a reconstructed image required can be obtained. After the I-frame is decoded and the reconstructed image is stored in the reconstructed-image buffer 202, the switch 401 is connected to contact A. At the same time, the switch 203 is turned on. In the switching target device according to the fourth embodiment, the decoder 201 has to decode only one intraframe before device switching.

By performing the operation described above, the reconstructed image required for decoding image data outputted from the media buffer 2108 is held in the reconstructed-image buffer 202. Therefore, regardless of whether the frame inputted from the media buffer 2108 upon switching is an intraframe or not, the decoder 201 can immediately start decoding.

In this way, the switching target device in the fast switching system according to the fourth embodiment is capable of starting decoding of data from the frame where device switching occurred upon switching, even if the data is interframe-compressed video picture data such as MPEG data. Thus, device switching can be accomplished so fast that the user will not perceive the switching delay. Furthermore, the decoder 201 does not have to be activated until device switching occurs. Rather, the decoder 201 has only to decode one intraframe immediately at the time of device switching. Accordingly, power consumption can be reduced.

A second implementation of the system according to the fourth embodiment may be employed that has a switching source device and switching target devices described below. The basic configuration of the switching source device in the second implementation is the same as that shown in FIG. 8, except for the internal configuration and operation of its encoder section 501. The basic configuration of the switching target devices is the same as that shown in FIG. 10, except for the internal configuration and operation of decoder section 701.

Figure 12:
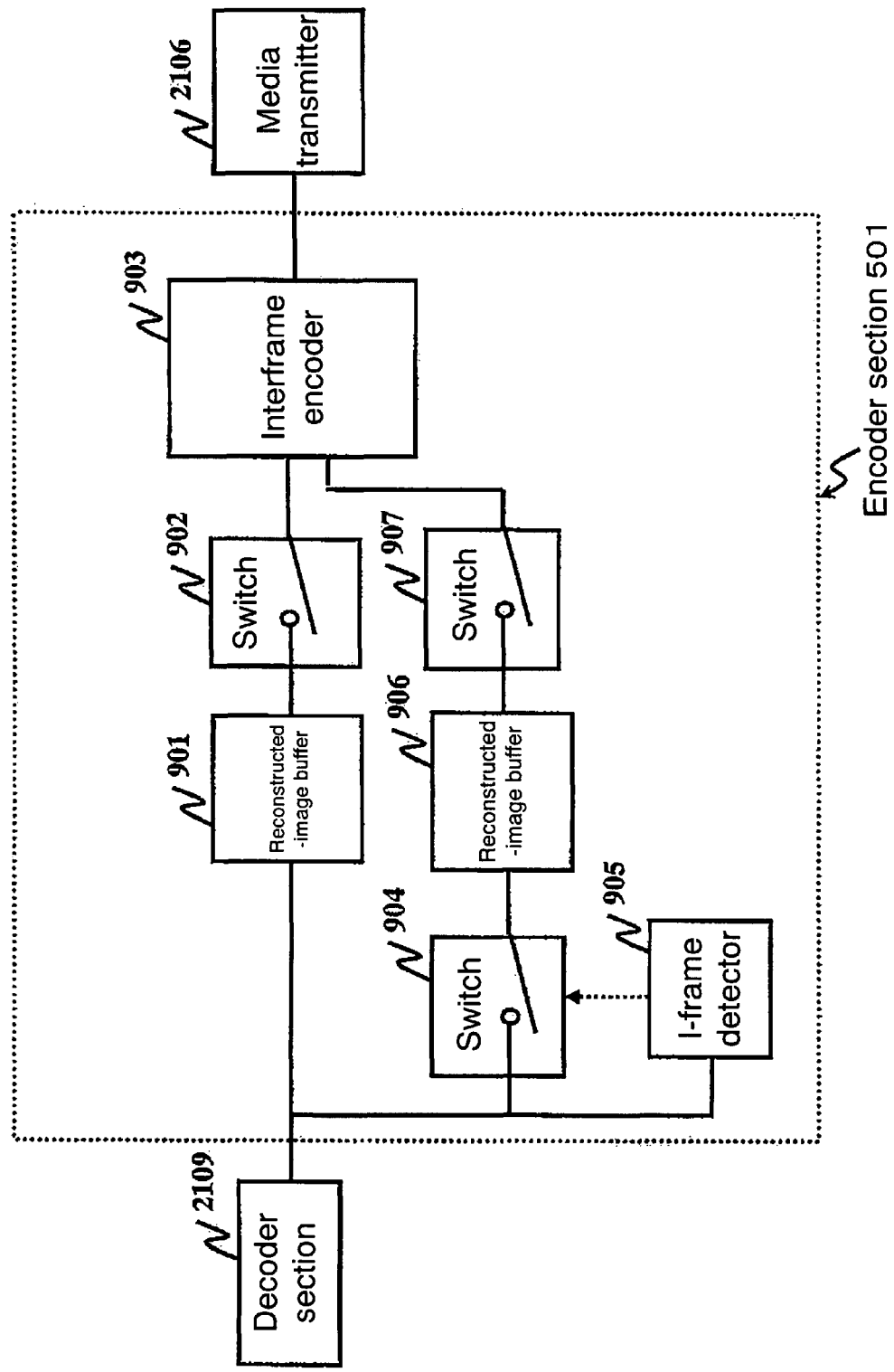
FIG. 12 shows an internal configuration of an encoder section of a sender device in a second implementation of the fourth embodiment.

FIG. 12 shows an internal configuration of the encoder section 501 of a switching source device in the second implementation of the fourth embodiment. The encoder section 501 in the second implementation includes a reconstructed-image buffer 901 for holding a reconstructed image decoded by a decoder section 2109, a reconstructed-image buffer 906 for holding a decoded reconstructed image as a reference image used for intraframe coding, three switches 902, 904, and 907, an interframe encoder 903 which performs interframe coding of a reconstructed image, and an I-frame detector 905 which detects an I-frame on the basis of frame type information provided from the decoder section 2109 and controls switch 904. The switches 902, 904, and 907 are the same as switch 203 in the second embodiment described with respect to FIG. 5. The reconstructed-image buffers 901 and the reconstructed-image buffer 906 are the same as the reconstructed-image buffer 601 in the first implementation of the fourth embodiment described with respect to FIG. 9.

An internal operation of the encoder section in the second implementation of the fourth embodiment will be described below. In the second implementation, a decoded reconstructed image, which is outputs from the decoding section 2109, is always inputted into there constructed-image buffer 901. Frame type information, which is an output from the decoder section 2109, is inputted in the I-frame detector 905. If the I-frame detector 905 determines from the frame type information that the reconstructed image is an I-frame before it is decoded by the decoder section 2109, switch 904 is turned on so that the reconstructed image is inputted into the reconstructed-image buffer 906 as a reference image. On the other hand, if the I-frame detector 905 determines from the frame type information that the reconstructed image is not an I-frame, switch 904 is turned off so that the reference image already held in the reconstructed-image buffer 906 is maintained.

Switches 902 and 907 are normally in the off state and are turned on when device switching is performed. When the switches 902 and 907 are turned on, the reconstructed image held in the reconstructed-image buffer 901 and the reference image held in the reconstructed-image buffer 906 are inputted in the interframe encoder 903, where interframe-coding is applied to the reconstructed image to generate a P-frame. The P-frame is generated by encoding the image by using correlation with the reference image. The P-frame requires the reference image for decoding. The outputted P-frame is sent to a media transmitter 2106, where the P-frame is attached to the payload of a media output indication message (M7), and transmitted to switching target devices (step S2812 in FIG. 2).

By the operation described above, the switching source device in the second implementation of the fourth embodiment interframe-codes a reconstructed image required for the switching target device to decode a frame when device switching occurred with the reference image, and transmits the interframe-coded image to the switching target device.

A switching target device that receives an interframe-coded reconstructed image transmitted from the switching source device will be described below.

Figure 13:
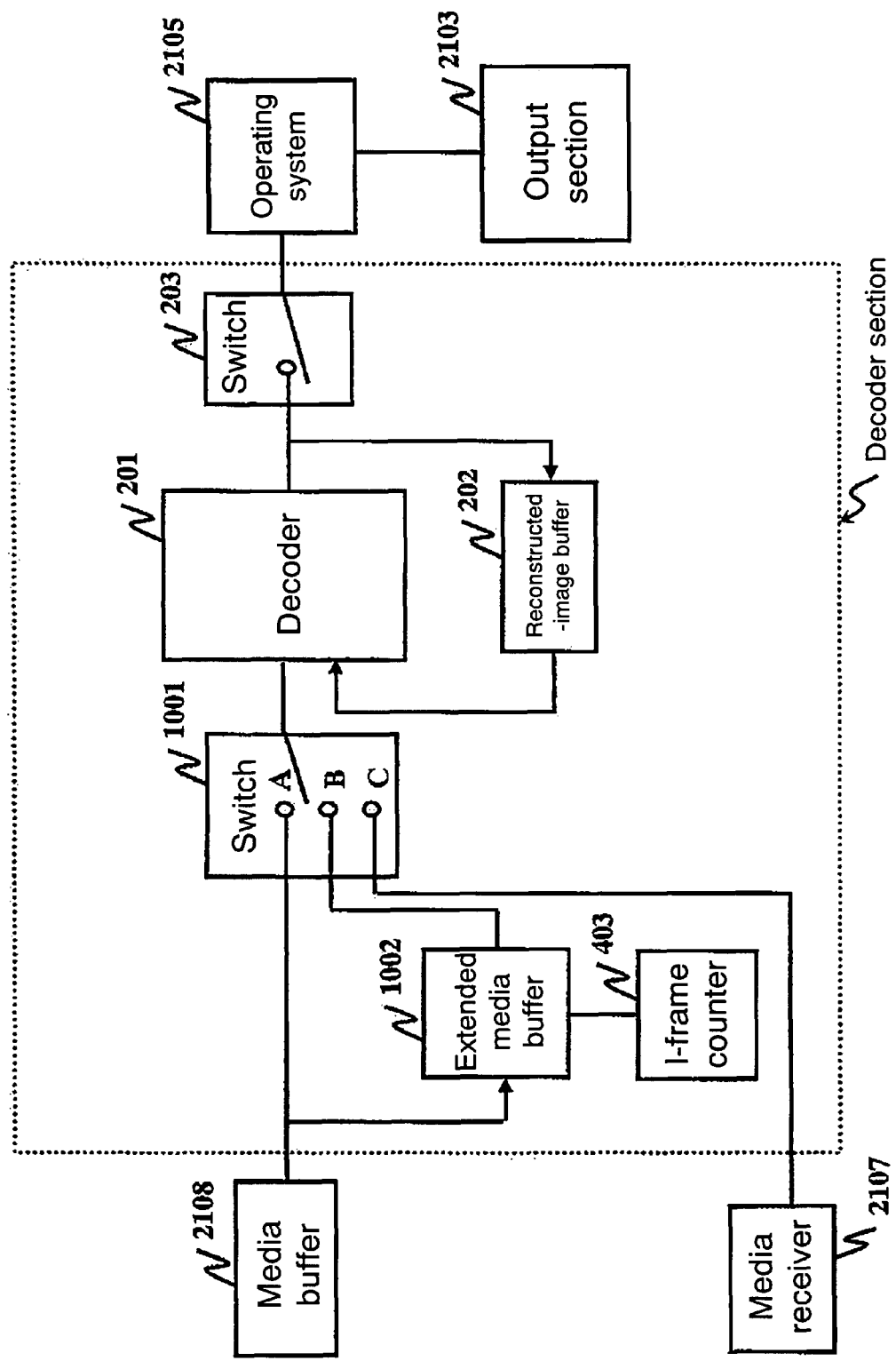
FIG. 13 shows an internal configuration of a decoder section of a switching target device in the second implementation of the fourth embodiment.

FIG. 13 shows an internal configuration of a decoder section of a switching target device in the second implementation of the fourth embodiment. The same components in FIG. 13 as those of the decoder section of the second embodiment shown in FIG. 5 or the decoder section of the third embodiment shown in FIG. 7 are labeled with the same reference numerals. The decoder section in the second implementation includes: a switch 1001 which can switch between four states, namely a state in which it is connected with contact A, a state in which it is connected with contact B, a state in which it is connected to contact C, and a state in which it is not connected any of the switches; a decoder 201 for decoding video picture data, a reconstructed-image buffer 202 which holds a decoded reconstructed image for use in decoding the succeeding video picture data; a switch 203 which controls a reconstructed image decoded by the decoder 201 to prevent it from flowing out of the decoder section and being displayed on a output section 2103; an extended media buffer 1002 for storing one frame of image data; and an I-frame counter 403 which identifies the frame type of image data and, when an I-frame (which is synonymous with an intraframe) is inputted in an extended media buffer 1002, resets the buffer.

An internal operation of the decoder section in the second implementation will be described next. In the second implementation, outputs from the media buffer 2108 are always inputted into the extended media buffer 1002. Operation of the extended media buffer 1002 is the same as that of the extended media buffer 402 of the decoder section of the third embodiment. However, the extended media buffer 1002 in the second implementation is smaller than the extended media buffer 402 of the third embodiment in buffer size and is capable of store only one frame of image data. The I-frame counter 403 monitors image data inputted into the extended media buffer 1002 and updates the frame held in the extended media buffer 1002 when an I-frame is inputted into the extended media buffer 1002. That is, the I-frame counter 403 permits only an I-frame to be stored and the extended media buffer 1002 holds only the latest I-frame. Contact A of switch 1001 is connected to the output of the media buffer 2108, contact B of switch 1001 is connected to the output of the extended media buffer 1002, and contact C of switch 1001 is connected to the output of a media receiver 2107. Switch 1001 is not connected to any of contacts A, B, and C until device switching occurs. That is, in the second implementation, data is not inputted into the decoder 2001 and therefore does not operate as in the third embodiment.

When the switching target device in the second implementation of the fourth embodiment receives a media output indication (M7) from a switching source device, the switch 1001 first connects to contact B and the I-frame held in the extended media buffer 1002 is sent to the decoder 201. The decoder 201 decodes the I-frame and stores the decoded reconstructed image in the reconstructed-image buffer 202. During this operation, the switch 203 is in the off state and therefore the reconstructed image is not outputted from the decoder section to the outside.

Then, switch 1001 connects to contact C and the media receiver 2107 extracts the interframe-coded image (P-frame) attached to the payload of the media output indication message (M7) and sends the P-frame to the decoder 201. The decoder 201 uses the reference image held in the reconstructed-image buffer 202 to decode the P-frame and holds the decoded reconstructed image in the reconstructed-image buffer 202. During this operation, switch 203 is still in the off state and therefore the reconstructed image is not outputted from the decoder section to the outside.

The P-frame has been generated at the switching source device by interframe-coding a reconstructed image required for decoding the top frame (the first frame to be outputted) in the media buffer 2108. A required reconstructed image can be obtained by decoding the P-frame. After the P-frame is decoded and the reconstructed image is stored in the reconstructed-image buffer 202, switch 1001 is connected to contact A. At the same time, switch 203 is turned on. The decoder 201 of the switching target device in the second implementation has only to decode two frames, an I-frame and a P-frame, upon device switching.

By the operation described above, a reconstructed image required for decoding image data outputted from the media buffer 2108 is held in the reconstructed-image buffer 202. Therefore, regardless of whether image data inputted from the media buffer 2108 is an intraframe of not, the decoder 201 can immediately start decoding.

In this way, the switching target device in the fast switching system in the second implementation of the fourth embodiment is capable of starting decoding interframe-compressed video picture data such as MPEG data from a frame where device switching occurred. Consequently, device switching which is so fast that the user will not perceive the switching delay can be accomplished. Furthermore, because the decoder 201 does not need to be activated until device switching occurs, and it is only necessary to encode two frames prior to switching, power consumption can be reduced. Information attached to the payload of a media output indication message (M7) sent from the switching source device to the switching target device is an interframe-coded image (P-frame). Accordingly, the amount of information transmitted can be reduced and a delay that would otherwise be caused during transmission of the message does not occur even in a PAN with a narrow bandwidth.

While currently preferred embodiments of the fast device switching technique according to the present invention have been described above, these embodiments are only illustrative of the present invention. The present invention is not limited to these embodiments. Modifications and changes to the embodiments fall within the scope of the present invention. It will be apparent from the foregoing description that various other embodiments are possible within the scope of the present invention. It will be appreciated that various variations of the embodiments are possible. It is intended that all such variations within the true spirit and scope of the present invention are included in the appended claims.

INDUSTRIAL APPLICATION

As has been described, the device switching system according to the present invention is a fast device switching system essential for flexibly switching between devices having a variety of capabilities to provide seamless service in a ubiquitous network.

Devices used in the system can be used as apparatuses which output movies recorded with a cellular phone, a digital still camera, or a digital video movie camera to a display device as a television display.

The invention claimed is:

1. A device switching system, comprising:
a sender device which has a session with a correspondent device in which video picture data compressed by an interframe compression method is sent from the correspondent device to the sender device; and
a plurality of distribution destination devices capable of communicating with the sender device,
wherein the sender device sends the video picture data compressed by the interframe compression method, which is sent from the correspondent device to the sender device in the session, to one or more distribution destination devices selected from among the plurality of distribution destination devices,
wherein the selected one or more distribution destination devices from among the plurality of distribution destination devices receive the video picture data compressed by the interframe compression method,
wherein the sender device chooses a switching target device from among the selected one or more distribution destination devices,
wherein the switching target device outputs the video picture data compressed by the interframe compression method at the same time that the switching target device is chosen by the sender device.

2. The device switching system according to claim 1, wherein the sender device multicasts or broadcasts the video picture data compressed by the interframe compression method to the selected one or more distribution destination devices.

3. The device switching system according to claim 1, wherein each of the distribution destination devices includes:
a media receiver which communicates with an external device;
a media buffer which holds video picture data compressed by an interframe compression method received at the media receiver;
a decoder section which decodes video picture data compressed by an interframe compression method;
a signaling section which controls a session;
a network interface; and
an output section which outputs the video picture data.

4. The device switching system according to claim 3, wherein the decoder section includes:
a decoder which decodes video picture data compressed by an interframe compression method when the video picture data is outputted from the media buffer;
a reconstructed-image buffer which holds a decoded reconstructed image; and
a switch which causes a reconstructed image to be outputted to the output section when the device switching is performed.

5. The device switching system according to claim 3, wherein the decoder section includes:
an extended media buffer which stores video picture data compressed by an interframe compression method outputted from the media buffer and is capable of storing a plurality of frames of the video picture data;
an I-frame counter which (i) determines whether video picture data inputted in the extended media buffer includes an I-frame or not, and (ii) if the video picture data includes an I-frame, controls the extended media buffer to clear a plurality of frames of video picture data stored in the extended media buffer and to start storing the video picture data from the inputted I-frame;
a decoder which, when the device switching occurs, decodes one or more frames of video picture data stored in the extended media buffer in a sequence starting from an I-frame, and then decodes video picture data outputted from the media buffer after the device switching;
a reconstructed-image buffer which holds a decoded reconstructed image; and
a switch which causes a reconstructed image to be outputted to the output section when video picture data outputted from the media buffer is decoded.

6. The device switching system according to claim 3, wherein the decoder section includes:
a decoder which, when the device switching occurs, decodes an image compressed by intraframe coding sent from the media receiver and then decodes video picture data outputted from the media buffer;
a reconstructed-image buffer which holds a decoded reconstructed image; and
a switch which causes a reconstructed image to be outputted to the output section after the image encoded by intraframe coding sent from the media receiver is decoded.

7. The device switching system according to claim 6, wherein the media receiver (i) extracts an intraframe-coded image attached to a payload of a media output indication sent from the sender device provided through the signaling section, on the basis of the media output indication, and (ii) sends the intraframe-coded image to the decoder section.

8. The device switching system according to claim 3, wherein the decoder section includes:
an extended media buffer which stores video picture data;
an I-frame counter which (i) determines whether video picture data outputted from the media buffer includes an I-frame or not, and (ii) if the video picture data includes an I-frame, controls the extended media buffer to clear an I-frame stored in the extended media buffer and to store the I-frame of the outputted video picture data;
a decoder which, when the device switching occurs, decodes an I-frame stored in the extended media buffer, then decodes an interframe-coded image sent from the media receiver, and then decodes video picture data outputted from the media buffer after the device switching;
a reconstructed-image buffer which holds a decoded reconstructed image; and
a switch which causes a reconstructed image to be outputted to the output section after an interframe-coded image sent from the media receiver is decoded.

9. The device switching system according to claim 8, wherein the media receiver (i) obtains an interframe-coded image attached to a payload of a media output indication sent from the sender device provided through the signaling section, on the basis of the media output indication, and (ii) sends the interframe-coded image to the decoder section.

10. The device switching system according to claim 1, wherein the sender device includes:
an application;
a network interface;
an output section which outputs media data;
an input section which is a user interface;
a media transmitter which transmits data to an external device;
a media buffer which holds video picture data compressed by an interframe compression method received by the media receiver;
a decoder section for decoding video picture data compressed by an interframe compression method;
an encoder section which encodes a reconstructed image decoded by the decoder section;
a signaling section for controlling a session; and
a service discovery section for discovering a service provided by an external device;
wherein the media transmitter (i) selects the one or more distribution destination devices on the basis of a response from the service discovery section and (ii) transfers the video picture data compressed by the interframe compression method received from the correspondent device to the selected one or more distribution destination devices.

11. The device switching system according to claim 10, wherein the encoder section includes:
a reconstructed-image buffer which overwrites a reconstructed image decoded by the decoder section to update the reconstructed image and holds the updated reconstructed image; and
an intraframe encoder which encodes a reconstructed image held in the reconstructed-image buffer as an intraframe when the device switching occurs.

12. The device switching system according to claim 11, wherein the media transmitter attaches an intraframe-coded image generated by the encoder section to a payload of a media output indication when the media transmitter provides the media output indication to the switching target device.

13. The device switching system according to claim 10, wherein the encoder section includes:
a reconstructed-image buffer which overwrites a reconstructed image decoded by the decoder section to update the reconstructed image and holds the updated reconstructed image;
an I-frame detector which determines whether a reconstructed image includes an I-frame or not when the reconstructed image is decoded at the decoder section;
a second reconstructed-image buffer which overwrites, if the I-frame detector determines that a reconstructed image includes an I-frame, the reconstructed image to update the reconstructed image and holds the updated reconstructed image as a reference image; and
an interframe encoder which encodes a reconstructed image held in the reconstructed-image buffer by interframe coding using a reference image held in the second reconstructed-image buffer when the device switching occurs.

14. The device switching system according to claim 13, wherein the media transmitter attaches an interframe-coded image generated by the encoder section to a payload of a media output indication when the media transmitter provides the media output indication to the switching target device.

15. A distribution destination device from among a plurality of distribution devices capable of communicating with a sender device which has a session with a correspondent device in which video picture data compressed by an interframe compression method is sent from the correspondent device to the sender device, the distribution destination device comprising:
a media receiver (i) which communicates with the sender device and (ii) which receives the video picture data compressed by the interframe compression method, which is sent from the correspondent device to the sender device in the session;
a media buffer which holds the video picture data compressed by the interframe compression method received by the media receiver;
a decoder section for decoding the video picture data compressed by the interframe compression method held by the media buffer;
a signaling section for controlling a session;
a network interface; and
an output section which outputs the video picture data decoded by the decoder section,
wherein the distribution device is one of one or more distribution destination devices, which are selected from among the plurality of distribution destination devices, that receive the video picture data compressed by the interframe compression method from the sender device,
wherein the output section outputs the video picture data compressed by the interframe compression method at the same time that the distribution device is chosen as a switching target device by the sender device.

16. The distribution destination device according to claim 15, wherein the decoder section includes:
a decoder which decodes video picture data compressed by an interframe compression method when the video picture data is outputted from the media buffer;
a reconstructed-image buffer which holds a decoded reconstructed image; and
a switch which causes a reconstructed image to be outputted to the output section when device switching occurs.

17. The distribution destination device according to claim 15, wherein the decoding section includes:
an extended media buffer which stores a plurality of frames of video picture data compressed by an interframe compression method outputted from the media buffer;
an I-frame counter which (i) determines whether video picture data inputted in the extended media buffer includes an I-frame or not and (ii) if the video picture data includes an I-frame, controls the extended media buffer to clear a plurality of frames of video picture data stored in the extended media buffer and to store the video picture data starting from the inputted I-frame;
a decoder which, when the device switching occurs, decodes one or more frames of video picture data stored in the extended media buffer in a sequence starting from an I-frame, and then decodes video picture data outputted from the media buffer after the device switching;
a reconstructed-image buffer which holds a decoded reconstructed image; and
a switch which causes a reconstructed image to be outputted to the output section after one or more frames of video picture data stored in the extended media buffer is decoded.

18. The distribution destination device according to claim 15, wherein the decoder section includes:
a decoder which, when the device switching occurs, decodes an image encoded by intraframe coding sent from the media receiver, and then decodes video picture data outputted from the media buffer;
a reconstructed-image buffer which holds a decoded reconstructed image; and
a switch which causes a reconstructed image to be outputted to the output section after an image encoded by intraframe coding sent from the media receiver is decoded.

19. The distribution destination device according to claim 18, wherein the media receiver (i) extracts an intraframe-coded image attached to a payload of a media output indication sent from the sender device provided through the signaling section, on the basis of the media output indication, and (ii) sends the intraframe-coded image to the decoder section.

20. The distribution destination device according to claim 15, wherein the decoder section includes:
an extended media buffer which stores video picture data;
an I-frame counter which (i) determines whether video picture data outputted from the media buffer includes an I-frame or not, and (ii) if the video picture data includes an I-frame, controls the extended media buffer to clear an I-frame stored in the extended media buffer and to store the I-frame of the outputted video picture data outputted from the media buffer;
a decoder which, when the device switching occurs, decodes an I-frame stored in the extended media buffer, then decodes an interframe-coded image sent from the media receiver, and then decodes video picture data outputted from the media buffer after the device switching;
a reconstructed-image buffer which holds a decoded reconstructed image; and
a switch which causes a reconstructed image to be outputted to the output section after an interframe-coded image sent from the media receiver is decoded.

21. The distribution destination device according to claim 20, wherein the media receiver (i) obtains an interframe-coded image attached to a payload of a media output indication sent from the sender device provided through the signaling section, on the basis of the media output indication, and (ii) sends the interframe-coded image to the decoder section.

22. A sender device which has a session with a correspondent device in which video picture data compressed by an interframe compression method is sent from the correspondent device to the sender device, the sender device comprising:
an application;
a network interface;
an output section which outputs media data;
an input section which is a user interface;
a media transmitter which transmits the video picture data compressed by the interframe compression method to the correspondent device;
a media buffer which holds the video picture data compressed by the interframe compression method;
a decoder section for decoding the video picture data compressed by the interframe compression method held by the media buffer;

an encoder section which encodes a reconstructed image decoded by the decoder section;

a signaling section for controlling a session; and a service discovery section for discovering a service provided by an external device;

wherein the media transmitter transmits the video picture data compressed by the interframe compression method, which is sent from the correspondent device to the media transmitter in the session, to one or more distribution destination devices selected from among a plurality of distribution destination devices, wherein the media transmitter selects a switching target device from among the selected one or more distribution destination devices on the basis of a response from the service discovery section, wherein the switching target device outputs the video picture data compressed by the interframe compression method at the same time that the switching target device is chosen by the media transmitter.

23. The sender device according to claim 22, wherein the encoder section includes:

a reconstructed-image buffer which overwrites a reconstructed image decoded by the decoder section to update the reconstructed image and holds the updated reconstructed image; and an intraframe encoder which encodes a reconstructed image held in the reconstructed-image buffer as an intraframe when the device switching occurs.

24. The sender device according to claim 23, wherein the media transmitter attaches an intraframe-coded image generated by the encoder section to a payload of a media output indication when the media transmitter provides the media output indication to the switching target device.

25. The sender device according to claim 22, wherein the encoder section includes:

a reconstructed-image buffer which overwrites a reconstructed image decoded by the decoder section to update the reconstructed image and holds the updated reconstructed image;

an I-frame detector which determines whether a reconstructed image includes an I-frame or not when the reconstructed image is decoded at the decoder section;

a second reconstructed-image buffer which overwrites, if the I-frame detector determines that a reconstructed image includes an I-frame, the reconstructed image to update the reconstructed image and holds the updated reconstructed image as a reference image; and an interframe encoder which encodes a reconstructed image held in the reconstructed-image buffer by interframe coding using a reference image held in the second reconstructed-image buffer when the device switching occurs.

26. The sender device according to claim 25, wherein the media transmitter attaches an interframe-coded image generated by the encoder section to a payload of a media output indication when the media transmitter provides the media output indication to the switching target device.

* * * * *